US 10,551,780 B2

(12) United States Patent
Funakawa

(10) Patent No.: US 10,551,780 B2
(45) Date of Patent: Feb. 4, 2020

(54) IMAGE PROCESSING APPARATUS WITH SHARED OPERATION PANEL AND PROGRAM FOR CONTROLLING THE SHARED OPERATION PANEL

(71) Applicant: KONICA MINOLTA, INC., Chiyoda-ku, Tokyo (JP)

(72) Inventor: Hisataka Funakawa, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 64 days.

(21) Appl. No.: 15/879,945

(22) Filed: Jan. 25, 2018

(65) Prior Publication Data
US 2018/0246452 A1  Aug. 30, 2018

(30) Foreign Application Priority Data
Feb. 24, 2017 (JP) .................. 2017-034072

(51) Int. Cl.
G06F 3/12 (2006.01)
G03G 15/00 (2006.01)
H04N 1/00 (2006.01)

(52) U.S. Cl.
CPC ..... *G03G 15/5016* (2013.01); *G03G 15/5087* (2013.01); *H04N 1/00384* (2013.01);
(Continued)

(58) Field of Classification Search
None
See application file for complete search history.

(56) References Cited

U.S. PATENT DOCUMENTS 8,942,852 B2   1/2015 Hiroo et al.
2005/0141020 A1* 6/2005 Harano ............ G06K 15/00
                                                    358/1.15
(Continued)

FOREIGN PATENT DOCUMENTS

CN    102749463 A   10/2012
JP    2013059986 A   4/2013

OTHER PUBLICATIONS

Chinese Office Action dated May 5, 2019 (and English translation thereof) issued in counterpart Chinese Application No. 201810154428.X.

Primary Examiner — Henok Shiferaw
(74) Attorney, Agent, or Firm — Holtz, Holtz & Volek PC

(57) ABSTRACT

An image processing apparatus includes: a first device; a second device; and an operation display part, wherein the operation display part includes: an operation panel; and a hardware processor that controls operations of the operation panel, the hardware processor is: capable of sending operation input information on the operation panel to the first device via a first interface; sending the operation input information on the operation panel to the second device via a second interface; and receiving a switch request of switching a device, the first interface and the second interface are of mutually different types, and when receiving the switch request, the hardware processor: changes a source device from which display contents of the operation panel are sent, and changes a destination device to which the operation input information on the operation panel is sent, and sends the operation input information to a post-changing destination device.

23 Claims, 20 Drawing Sheets

(52) U.S. Cl.
CPC ............... *H04N 1/00411* (2013.01); *G03G 2215/00109* (2013.01); *H04N 2201/0094* (2013.01)

(56) References Cited

U.S. PATENT DOCUMENTS

| | | |
|---|---|---|
| 2012/0269681 A1 | 10/2012 | Hiroo et al. |
| 2013/0069891 A1 | 3/2013 | Tanaka |
| 2014/0340706 A1* | 11/2014 | Kondo .................. G06F 3/1253 358/1.15 |
| 2016/0054962 A1* | 2/2016 | Park .................... H04L 41/0806 358/1.15 |
| 2017/0289314 A1* | 10/2017 | Nakamura ............ H04L 67/142 |

* cited by examiner

IMAGE PROCESSING APPARATUS WITH SHARED OPERATION PANEL AND PROGRAM FOR CONTROLLING THE SHARED OPERATION PANEL The entire disclosure of Japanese patent Application No. 2017-034072, filed on Feb. 24, 2017, is incorporated herein by reference in its entirety.

BACKGROUND

Technological Field

The present invention relates to an image processing apparatus such as multi-functional peripheral (MFP), and its related technique.

Description of the Related Art

There is a technique that exchanges a signal between an operation display part and a control unit by use of an interface for incorporated apparatuses such as Inter-Integrated Circuit (I2C) in a MFP (image processing apparatus) (see JP 2013-59986 A (particularly paragraph 0115) and the like).

A MFP is an apparatus that realizes image processing functions (such as printing function and/or scanning function).

The present applicants have proposed that a plurality of independently-operating devices (such as devices including server device (or server computer apparatus) in addition to image forming device (such as conventional MFP)) are provided as apparatuses (MFP) that realize not only the image processing functions but other functions in one image processing apparatus (MFP). The present applicants have further proposed that one operation display part is shared by the devices in such an image processing apparatus. The technique integrating a plurality of devices can meet a request of space saving and/or a request of management facilitation in an office environment.

An interface such as I2C is used as a transmission interface for transmitting operation input information (such as touch information) on a touch panel from the operation display part to an image forming device (such as conventional MFP) in the image forming device. The interface such as I2C is an interface (highly specialized interface) suitable to be designed according to the device.

On the other hand, the server device is required to detect various operation inputs (such as double tap, long tap, flick, and multi-touch operation using a plurality of (2 to 10) fingers, not only single tap) usable in OS of a general-purpose computer. A relatively universal (and high-speed) interface such as USB is used as a transmission interface for transmitting the operation input information from the operation display part to the server device. Various applications provided from various vendors are required to operate in the server device unlike conventional MFP. A relatively universal interface such as USB is required to be used as an interface for transmitting the operation input information under such circumstances.

However, if a common type of interfaces between each device and the operation display part is desired in the above technique (technique in which a plurality of independently-operating devices are provided in one image processing apparatus (MFP) and one operation display part is shared by the devices), addition of a USB interface to the image forming device and/or modification of various programs to operate in the USB interface is required. Therefore, a problem of additional cost or the like occurs.

SUMMARY

It is therefore an object of the present invention to provide a technique that does not require a common type of interfaces for transmitting operation input information from an operation display part to each device when a plurality of devices are provided in an image processing apparatus and the operation display part is shared by the devices.

To achieve the abovementioned object, according to an aspect of the present invention, an image processing apparatus reflecting one aspect of the present invention comprises: a first device; a second device; and an operation display part that is shared by the first device and the second device, wherein the operation display part includes: an operation panel that is shared by the first device and the second device; and a hardware processor that controls operations of the operation panel, the hardware processor is: capable of sending operation input information on the operation panel to the first device via a first interface connecting the first device and the operation panel; capable of sending the operation input information on the operation panel to the second device via a second interface connecting the second device and the operation panel; and capable of receiving a switch request of switching a device using the operation panel, the first interface and the second interface are of mutually different types, and when receiving the switch request, the hardware processor: changes a source device from which display contents of the operation panel are sent, and changes a destination device to which the operation input information on the operation panel is sent, and sends the operation input information on the operation panel to a post-changing destination device via a post-changing interface corresponding to the post-changing destination device out of the first interface and the second interface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 15 is a diagram illustrating a problem due to display delay or the like;

FIG. 16 is a diagram illustrating a problem due to display delay or the like;

DETAILED DESCRIPTION OF EMBODIMENTS

Hereinafter, one or more embodiments of the present invention will be described with reference to the drawings. However, the scope of the invention is not limited to the disclosed embodiments.

Embodiments of the present invention will be described below with reference to the drawings.

1. First Embodiment

<1-1. Configuration Outline>

Figure 1:
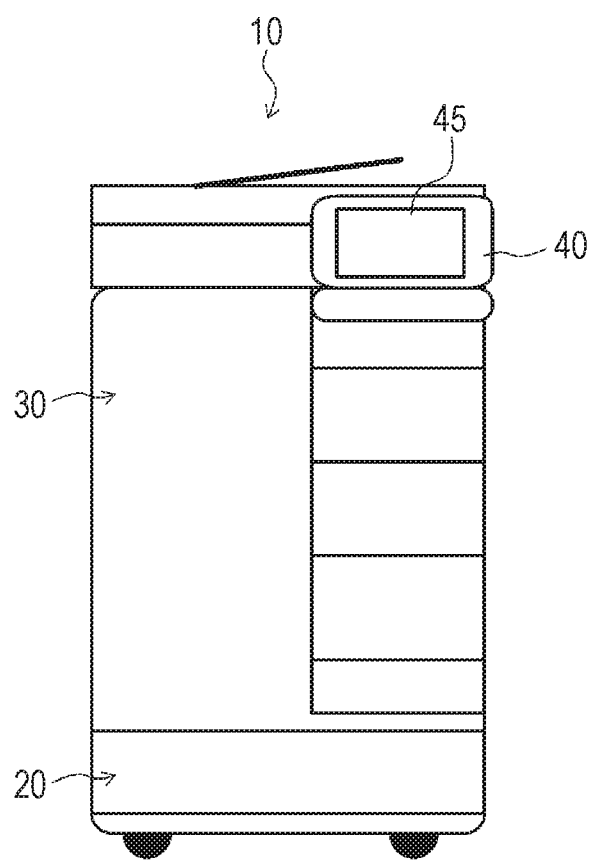
FIG. 1 is a diagram illustrating an appearance of a MFP.

FIG. 1 is a diagram illustrating an appearance of a multi-functional peripheral (MFP) 10. The MFP 10 is illustrated as an image processing apparatus herein. The MFP 10 is also called image forming apparatus.

Figure 2:
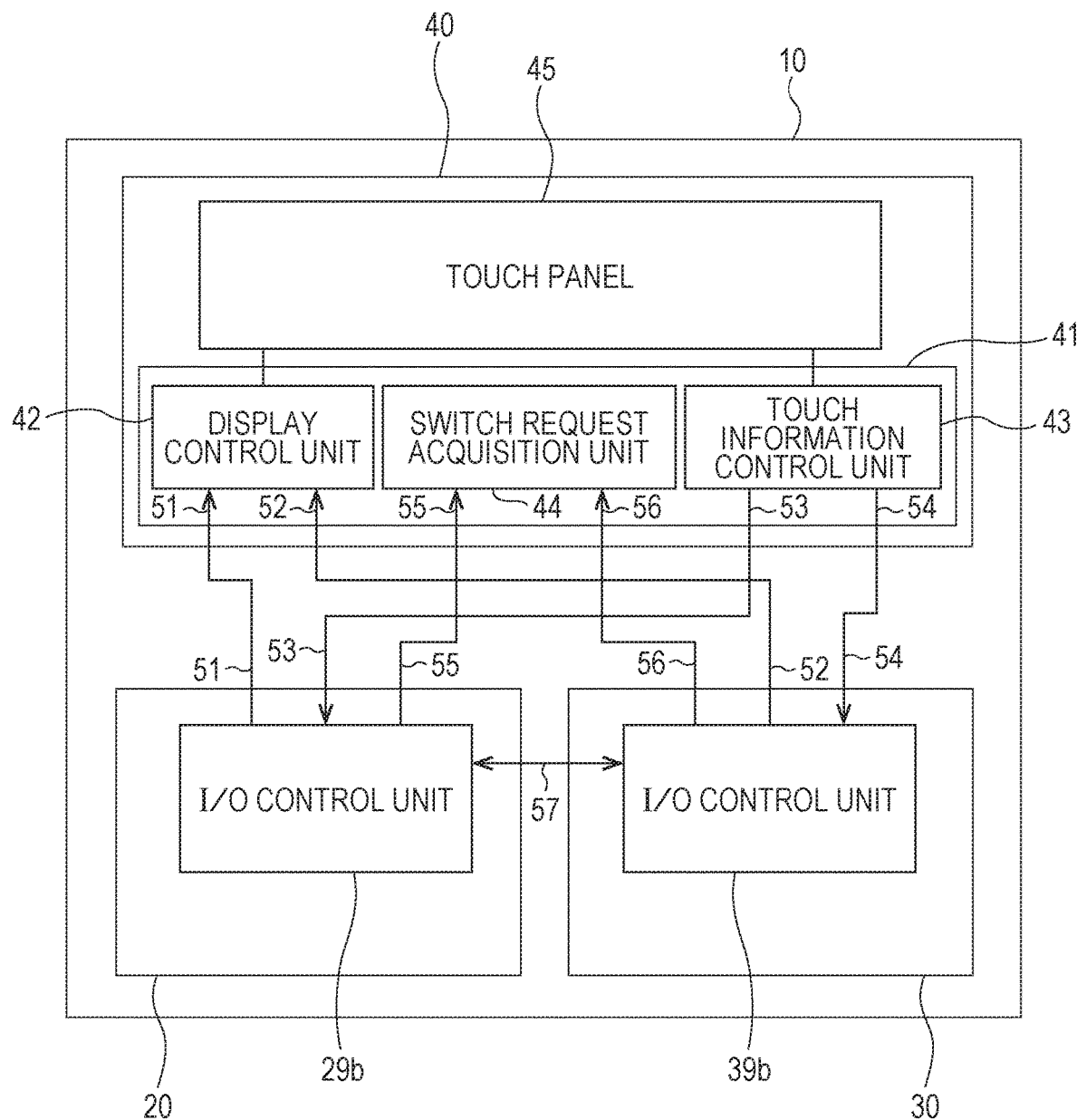
FIG. 2 is a diagram illustrating a schematic configuration of the MFP.

FIG. 2 is a diagram illustrating a schematic configuration of the MFP 10.

The MFP 10 includes a plurality of independently-operating devices (two devices including a server device 20 and an image forming device 30 here). Here, the server device 20 and the image forming device 30 are housed in one casing and are integrally configured. The casing is assumed to include a predetermined member and a member provided on the predetermined member in an openable/closable manner (such as document cover rotatably provided on a rotation shaft provided on a document table of the MFP 10).

The MFP 10 further includes an operation display part 40 (described below). The operation display part 40 is shared by the devices 20 and 30 as described below.

<1-2. Configuration of Image Forming Device 30>

The image forming device 30 (see also FIG. 1) is capable of performing various jobs (such as copying job and scanning job). The image forming device 30 is also called MFP device.

Figure 3:
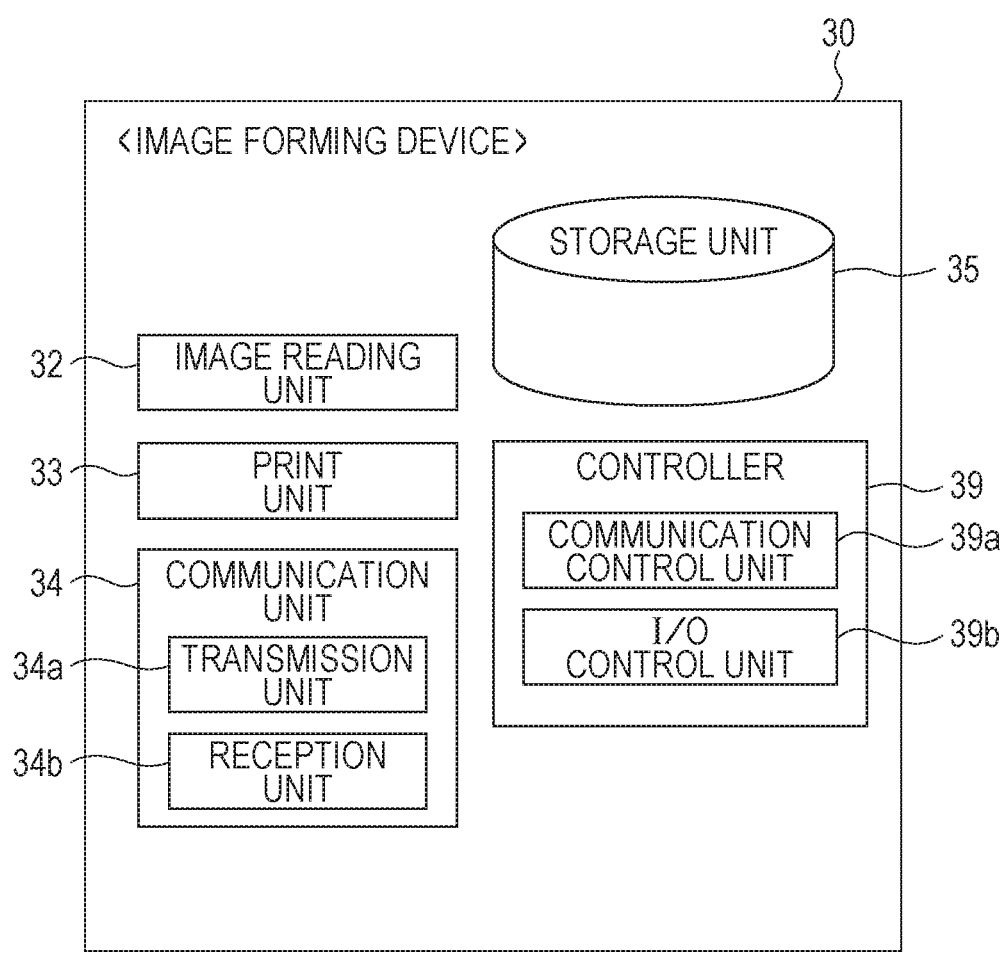
FIG. 3 is a diagram illustrating functional blocks of an image forming device.

FIG. 3 is a diagram illustrating functional blocks of the image forming device 30. The image forming device 30 manages the functions to be managed (such as copying function, scanning function, facsimile function, and box function). Specifically, the image forming device 30 includes an image reading unit 32, a print unit 33, a communication unit 34, a storage unit 35, and a controller (control unit) 39 as illustrated in FIG. 3, and causes each unit to operate in a combined manner thereby to achieve various functions (functions to be managed).

The image reading unit 32 is a processing unit that optically reads (or scans) a document placed at a predetermined position (such as auto document feeder (ADF) or glass surface) in the image forming device 30 thereby to generate image data (which is also called document image or scanned image) of the document. The image reading unit 32 is also called scanning unit. The image forming device 30 is capable of reading a document placed at a predetermined position, and is also called image reading device.

The print unit 33 is an output unit that prints out an image onto various mediums such as sheet on the basis of data on an object to be printed. The image forming device 30 is capable of printing out an image onto various mediums, and is also called print device.

The communication unit 34 is capable of making facsimile communication via a public line or the like. The communication unit 34 is further capable of making network communication via a network. Various protocols such as Transmission Control Protocol/Internet Protocol (TCP/IP) are utilized in the network communication. The image forming device 30 can exchange various items of data with a desired party by use of the network communication.

The storage unit 35 is configured of various storage apparatuses (such as (volatile and/or nonvolatile) semiconductor memory and/or hard disk drive (HDD)).

The controller 39 is a control apparatus that is incorporated in the image forming device 30 and entirely controls the image forming device 30. The controller 39 is configured as a computer system including a CPU, various semiconductor memories (RAM and ROM), and the like. The controller 39 executes predetermined software programs (which will be simply called program below) stored in the ROM (such as EEPROM (registered trademark)) thereby to realize various processing units. The programs (a group of program modules in detail) are recorded in a portable recording medium such as USB memory, and may be read from the recording medium and installed in the image forming device 30. Alternatively, the programs may be downloaded via a network and installed in the image forming device 30.

Specifically, as illustrated in FIG. 3, the controller 39 executes the programs thereby to realize various processing units including a communication control unit 39a and an I/O control unit 39b.

The communication control unit 39a is a processing unit that controls a communication operation with other devices (including devices (such as the server device 20) in the same casing (the same apparatus) and devices in other apparatus configured in another casing) in cooperation with the communication unit 34 or the like.

The I/O control unit 39b is a processing unit that controls an input operation (operation of receiving operation input) on the operation display part 40 (particularly a touch panel 45) and a display operation (display and output operation) in the operation display part 40 (particularly the touch panel 45) in cooperation with the operation display part 40 (FIG. 1). For example, the I/O control unit 39b displays information and the like on the functions to be managed of the image forming device 30 on the operation display part 40 (the touch panel 45), and acquires operation input information (such as touch information) on user operations on the operation display part 40 from the operation display part 40.

<1-3. Configuration of Server Device 20>

The server device 20 (see also FIG. 1) is capable of realizing a server function. The server device 20 is configured as a general-purpose computer apparatus, for example.

Figure 4:
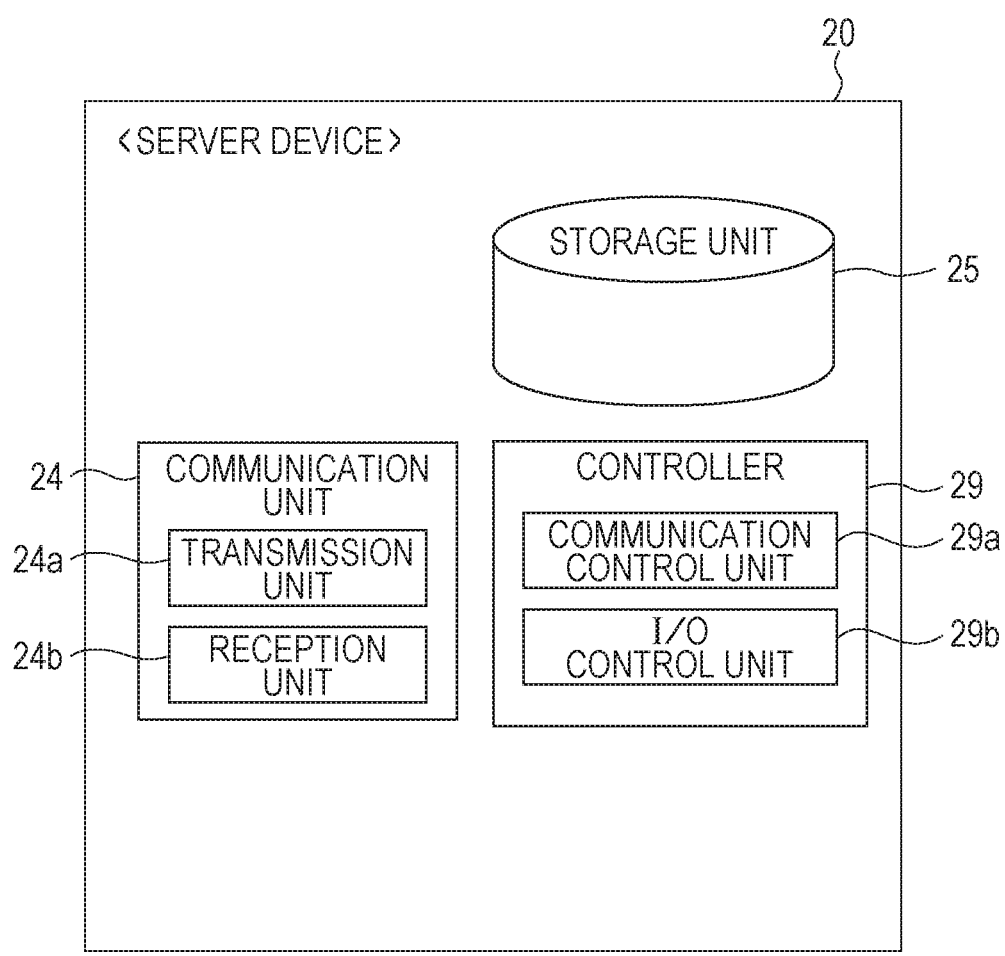
FIG. 4 is a diagram illustrating functional blocks of a server device.

FIG. 4 is a diagram illustrating functional blocks of the server device 20.

The server device 20 includes a communication unit 24, a storage unit 25, and a controller (control unit) 29 as illustrated in the functional block diagram of FIG. 4, and causes each unit to operate in a combined manner thereby to realize various functions.

The communication unit 24 can make network communication. Various protocols such as Transmission Control Protocol/Internet Protocol (TCP/IP) are utilized in the network communication. The server device 20 can exchange various items of data with a desired party by use of the network communication.

The storage unit 25 is configured of various storage apparatuses (such as (volatile and/or nonvolatile) semiconductor memory and/or hard disk drive (HDD)).

The controller (control unit) 29 is a control apparatus that is incorporated in the server device 20 and entirely controls the server device 20. The controller 29 is configured as a computer system including a CPU, various semiconductor memories (RAM and ROM), and the like. The controller 29 executes predetermined programs stored in the storage unit (such as semiconductor memory) in the CPU thereby to realize various processing units. The programs (a group of program modules in detail) are recorded in a portable recording medium such as USB memory, and may be read from the recording medium and installed in the server device 20. Alternatively, the programs may be downloaded via a network and installed in the server device 20.

Specifically, the controller 29 executes the programs or the like thereby to realize various processing units including a communication control unit 29a and an I/O control unit 29b.

The communication control unit 29a is a processing unit that controls a communication operation with other devices (such as devices (such as the image forming device 30) in the same casing (the same apparatus) and devices in other apparatus in another casing) in cooperation with the communication unit 24 or the like.

The I/O control unit 29b is a processing unit that controls an input operation on the operation display part 40 (particularly the touch panel 45) and a display operation in the operation display part 40 (particularly the touch panel 45) in cooperation with the operation display part 40. For example, the I/O control unit 29b displays information and the like on the functions to be managed of the server device 20 on the operation display part 40 (the touch panel 45) and acquires operation input information on user operations on the operation display part 40 (the touch panel 45) from the operation display part 40.

The server device 20 manages the functions to be managed (such as e-mail function, data saving function, format conversion function (file format conversion function), and image edition function). Specifically, applications (application software programs) for realizing various functions (functions to be managed) are preinstalled in the server device 20, and the server device 20 realizes various functions (functions to be managed) by use of each application.

Here, an e-mail application, a data saving application, a format conversion application, and an image edition application are preinstalled in the server device 20.

The e-mail application is capable of exchanging e-mails with other apparatuses, and the server device 20 executes the e-mail application thereby to realize the e-mail function.

The data saving application is capable of saving various items of data in the server device 20, and the server device 20 executes the data saving application thereby to realize the data saving function.

The format conversion application is capable of converting a file format of a designated file into other file format, and the server device 20 executes the format conversion application thereby to realize the format conversion function.

The image edition application is capable of editing designated image data, and the server device 20 executes the image edition application thereby to realize the image edition function.

<1-4. Configuration of Operation Display Part 40>

The MFP 10 is provided with the operation display part 40 (see FIG. 1) in a substantially plate-like shape. The operation display part 40 has the touch panel 45 (see FIG. 1) on its front surface. The touch panel (which is also called operation panel) 45 is configured such that various sensors are embedded in a liquid crystal display panel, and can display various items of information and receive various operation inputs from an operator. The touch panel 45 functions as an operation input unit that receives user operation inputs on the touch panel 45 and functions as a display part that displays various items of information.

The operation display part 40 (particularly the touch panel 45) is shared by a plurality of devices (two devices including the server device 20 and the image forming device 30 here).

The operation display part 40 includes a panel controller 41 in addition to the touch panel 45 as illustrated in FIG. 2. The panel controller 41 is a processing unit that controls the operations of the touch panel 45. The panel controller 41 is a processing unit that performs a processing of selecting (switching) a device using (using device) the operation display part 40 out of a plurality of devices (the server device 20 and the image forming device 30 here). Display and output are performed for a using device out of the devices on the touch panel 45. User operation input (operation input information) on the touch panel 45 is output to a using device and used in the using device.

The panel controller 41 is configured as a computer system including a central processing unit (CPU) (which is also called microprocessor or computer processor), various semiconductor memories (RAM and ROM), and the like. The panel controller 41 is a controller that executes predetermined programs stored in the storage unit (such as semiconductor memory) in the CPU thereby to control various operations on the operation display part 40 (such as the touch panel 45). The programs (a group of program modules in detail) are recorded in a portable recording medium such as USB memory and may be read from the recording medium and installed in the operation display part 40. Alternatively, the programs may be downloaded via a network and installed in the operation display part 40.

Specifically, the panel controller 41 (see FIG. 2) executes the programs or the like thereby to realize various processing units including a display control unit 42, a touch information control unit 43, and a switch request acquisition unit 44.

The display control unit 42 is a processing unit that controls display and output of the touch panel 45.

The touch information control unit 43 is a processing unit that controls an input processing of receiving user operation inputs on the touch panel 45, and the like.

The switch request acquisition unit 44 is a processing unit that receives and acquires a device switch request (which is simply called switch request) from the server device 20 and/or the image forming device 30. The switch request is a switch request (change request) of switching (changing) a device using the operation display part 40. The switch request is expressed as a switch request of switching a device to which operation input information is sent (which is also called destination device) or a switch request of switching a device from which display information is sent (which is also called source device).

The switch request can be transmitted from each of the devices 20 and 30 to the operation display part 40. Specifically, it is transmitted to the operation display part 40 from the server device 20 via a communication line 55 connecting the server device 20 and the operation display part 40, or from the image forming device 30 via a communication line 56 connecting the image forming device 30 and the operation display part 40.

The operation display part 40 is connected to the server device 20 via a display interface (interface cable and connection terminal in detail) 51, and is connected to the image forming device 30 via a display interface 52. The display interfaces 51 and 52 are of the same standard (any of VGA standard, DVI standard, HDMI (registered trademark) standard, and DisplayPort standard, for example).

When receiving a device switch request (which is simply called switch request) by use of the switch request acquisition unit 44, the panel controller 41 changes the source device from which display data on the touch panel 45 is sent by use of the display control unit 42. Specifically, when a device switch request is received by the switch request acquisition unit 44, the display control unit 42 changes the source device from one device (such as the server device 20) as currently-using device to the other device (the image forming device 30). Thereby, the display information on the touch panel 45 (data on display contents) is transmitted (sent) from the post-changing source device (which is also called post-switching device) to the operation display pan 40.

In this way, the display contents displayed on the touch panel 45 are transmitted from one device selected from the two devices 20 and 30 to the operation display part 40 via the interface (51 or 52) (which are of the same standard) corresponding to the device, and are received by the operation display part 40.

The operation display part 40 is connected to the server device 20 via an operation input information interface (interface cable and connection terminal in detail) 53. In other words, the operation input information on the touch panel 45 (such as touch information on the touch panel 45 by finger operation or the like) can be sent to the server device 20 via the interface 53.

The operation display part 40 is connected to the image forming device 30 via an operation input information interface 54. In other words, the operation input information on the touch panel 45 can be sent to the image forming device 30 via the interface 54.

The interfaces 53 and 54 are of mutually different types of interfaces (interfaces conforming to mutually different standards in detail).

The interface 53 connecting the server device 20 and the operation display part 40 is a relatively universal interface (interface in Universal Serial Bus (USB) standard here).

On the other hand, the interface 54 connecting the image forming device 30 and the operation display part 40 is a relatively non-universal interface (interface in Inter-Integrated Circuit (I2C) standard here). The interface 54 is used in incorporated devices and the like in many cases. Not limited thereto, an interface (other type of relatively non-universal interface) such as Universal Asynchronous Receiver Transmitter (UART) may be used instead of I2C.

When receiving the switch request, the panel controller 41 changes the destination device to which the operation input information (such as touch information) on the touch panel 45 is sent. In other words, the operation input information is exchanged by dynamically switching the two types of interfaces.

Specifically, when a device switch request is received by the switch request acquisition unit 44, the touch information control unit 43 changes the destination device from one device (such as the server device 20) as currently-using device to the other device (the image forming device 30). Thereby, the post-changing interface corresponding to the post-changing destination device (such as the interface (interface in the I2C standard) 54) is used thereby to send the operation input information on the touch panel 45 to the post-changing destination device (the image forming device 30, for example).

More specifically, an interface (USB interface) with a relatively high communication rate (such as 480 megabits per second (Mbps)) is used for communication between the operation display part 40 and the server device 20. An interface (I2C interface) with a relatively low communication rate (such as 400 kilobits per second (Kbps)) is used for communication between the operation display part 40 and the image forming device 30.

An interface (such as USB interface) in the same standard as the interface for the server device 20 may be used as an interface for the image forming device 30. However, software for the image forming device 30 needs to be reconstructed in order to change an interface for the image forming device 30 from a conventional interface (such as I2C interface) for incorporated devices to a relatively universal interface (such as USB interface), which needs considerable effort and high cost. Thus, it is not desirable that the interface for the image forming device 30 is changed to the USB interface for the server device 20. To the contrary, according to the embodiment, it is so useful that the interfaces (such as the USB interface and the I2C interface) with the types corresponding to the two devices 20 and 30, respectively, are dynamically switched and used.

<1-5. Screen Transition>

Figure 5:
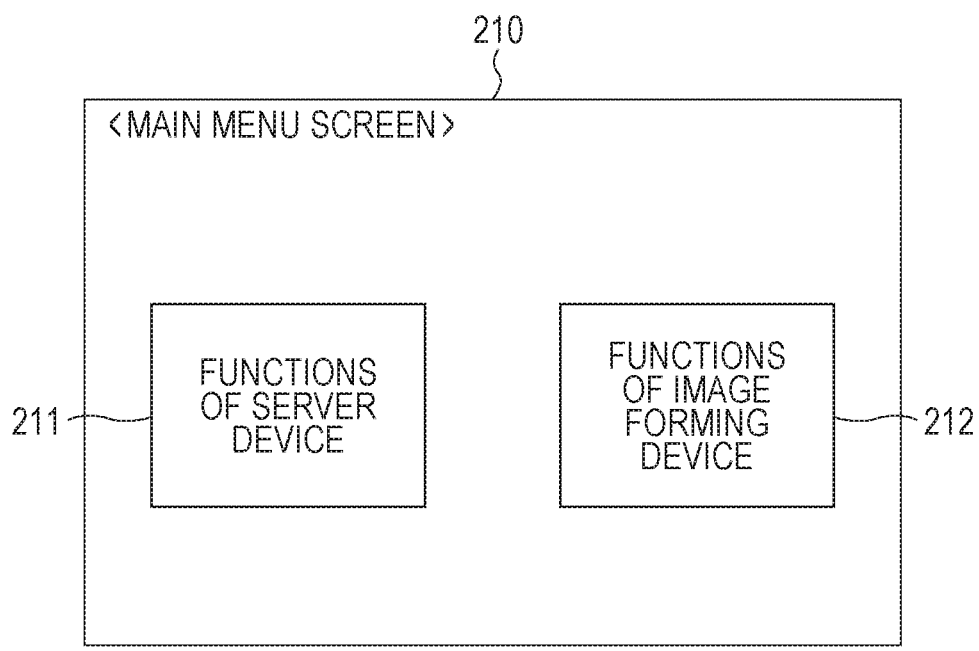
FIG. 5 is a diagram illustrating a top menu screen.
Figure 6:
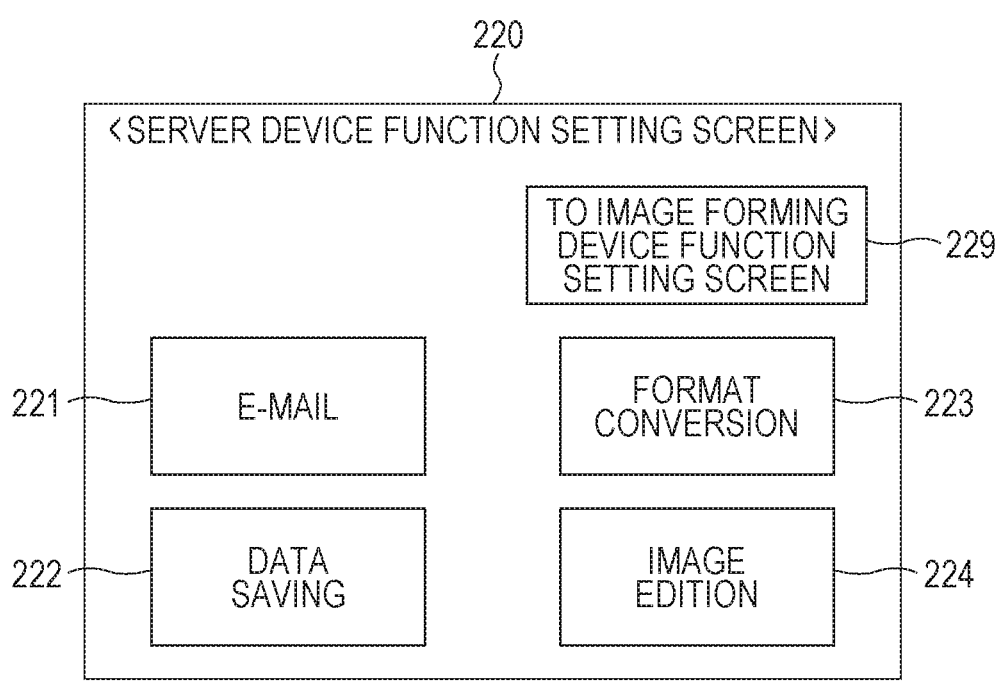
FIG. 6 is a diagram illustrating a setting screen for functions to be managed of the server device.
Figure 7:
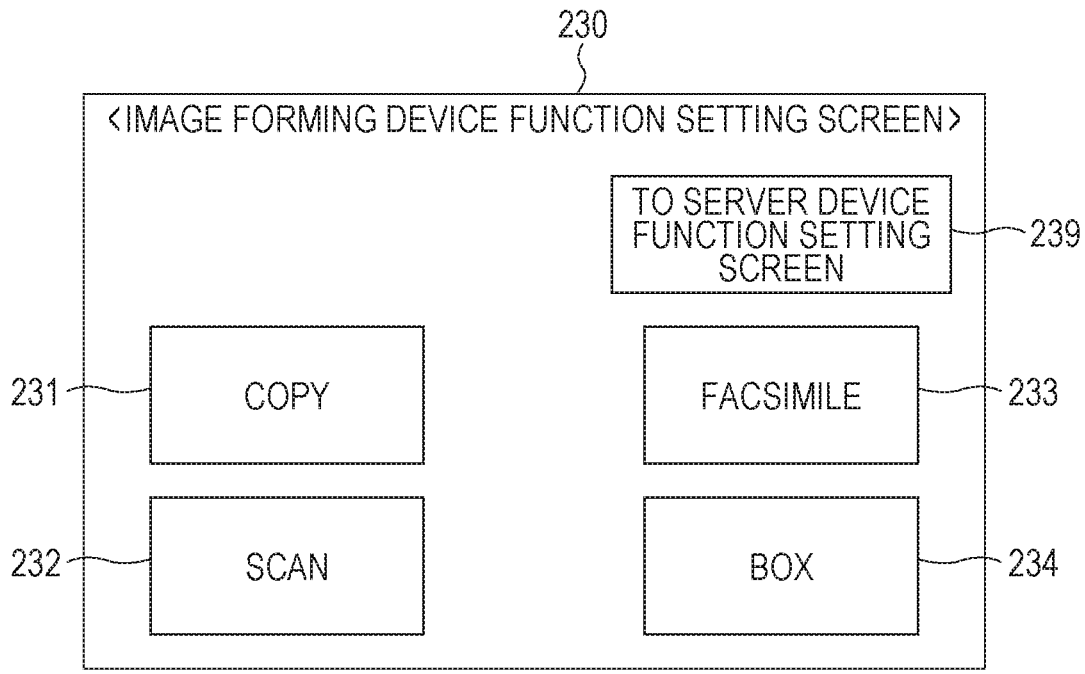
FIG. 7 is a diagram illustrating a setting screen for functions to be managed of the image forming device.

The screens as illustrated in FIG. 5 to FIG. 7 are displayed on the MFP 10, for example.

FIG. 5 is a diagram illustrating a top menu screen 210. For example, according to the embodiment, (not the image forming device 30 but) the server device 20 in the two devices functions as a main device in the initial state of the MFP 10, and the top menu screen 210 (see FIG. 5) is displayed on the touch panel 45 of the operation display part 40 under control of the server device 20.

The top menu screen 210 displays a button 211 for transiting to a setting screen for the functions to be managed of the server device 20 and a button 212 for transiting to a setting screen for the functions to be managed of the image forming device 30 thereon as illustrated in FIG. 5.

When the user presses (selects) a desired button out of the two buttons 211 and 212, screen transition is caused.

For example, when the button 211 (FIG. 5) is pressed in the top menu screen 210, a setting screen 220 (FIG. 6) for the functions to be managed of the server device 20 is displayed. The setting screen 220 is a setting screen (top menu screen) for the functions to be managed of the server device 20. The setting screen 220 displays four buttons 221 to 224 thereon as illustrated in FIG. 6. The button 221 is for transiting to a detailed setting screen of the e-mail function, and the button 222 is for transiting to a detailed setting screen of the data saving function. The button 223 is for transiting to a detailed setting screen of the file format conversion function, and the button 224 is for transiting to a detailed setting screen of the image edition function. The setting screen 220 has the sub-menu screens (detailed setting screens) in a lower hierarchy, and transits to a detailed setting screen corresponding to a pressed button when any of the buttons 221 to 224 in the setting screen 220 is pressed.

Alternatively, when the button 212 (FIG. 5) in the top menu screen 210 is pressed, a setting screen 230 (FIG. 7) for the functions to be managed of the image forming device 30 is displayed. The setting screen 230 is a setting screen (top menu screen) for the functions to be managed of the image forming device 30. The setting screen 230 displays four buttons 231 to 234 thereon as illustrated in FIG. 7. The button 231 is for transiting to a detailed setting screen of the copying function, and the button 232 is for transiting to a detailed setting screen of the scanning function. The button 233 is for transiting to a detailed setting screen of the facsimile function, and the button 234 is for transiting to a detailed setting screen of the box function. The setting screen 230 has the sub-menu screens (detailed setting screens) in a lower hierarchy, and transits to a detailed setting screen corresponding to a pressed button when any of the buttons 231 to 234 in the setting screen 230 is pressed.

Here, the server device 20 transmits a switch request (change request) of switching (changing) a device using the operation display part 40 from the server device 20 to the image forming device 30 to the image forming device 30 and the operation display part 40 when the button 212 (FIG. 5) in the screen 210 is pressed. The operation display part 40 performs the device switching processing as described below, and the image forming device 30 generates display data of a screen (such as the screen 230) to be displayed on the operation display part 40 after the device switching, and transmits the display data to the operation display part 40. The operation display part 40 displays a display screen (such as the setting screen 230) on the basis of the display data received from the image forming device 30.

The setting screen 220 has a button 229. The button 229 is for transiting to a setting screen of the functions of the image forming device. When the button 229 is pressed, screen transition to the setting screen 230 is caused.

Also when the button 229 (FIG. 6) in the screen 220 is pressed, the server device 20 transmits a similar switch request (change request) to the image forming device 30 and the operation display part 40. The display screen transition operation is then performed.

In this way, a using device switch request (a switch request of switching from the server device 20 to the image forming device 30) is made when the button 212 (FIG. 5) in the screen 210 or the button 229 (FIG. 6) in the screen 220 is pressed. A device using the operation display part 40 is switched from the server device 20 to the image forming device 30.

The setting screen 230 has a button 239. The button 239 is for transiting to a setting screen for the functions of the server device. When the button 239 is pressed, screen transition to the setting screen 220 is caused.

When the button 239 (FIG. 7) in the screen 230 is pressed by the user, the image forming device 30 transmits a switch request (change request) of switching (changing) a device using the operation display part 40 from the image forming device 30 to the server device 20 to the server device 20 and the operation display part 40 in response to the press operation. The operation display part 40 performs the device switching processing as described below, and the server device 20 generates display data of a screen (such as the screen 220) to be displayed on the operation display part 40 after the device switching, and transmits the display data to the operation display part 40. The operation display part 40 displays a display screen (such as the setting screen 220) on the basis of the display data received from the server device 20. The destination device to which the operation input information on the touch panel 45 is sent is also changed in response to the switch request. Specifically, the operation input information destination device is changed from the server device 20 (pre-switching device) to the image forming device 30 (post-switching device). The switch request is expressed as a switch request of changing a destination device to which the operation input information on the touch panel 45 is sent from the pre-switching device to the post-switching device.

In this way, a using device switch request (switch request of switching from the image forming device 30 to the server device 20) is made when the button 239 (FIG. 7) in the screen 230 is pressed.

In this way, the operation display part 40 displays a function corresponding to a user-selected button on the touch panel 45 in cooperation with the device (management device) that manages the function. In other words, a device alternatively selected from the devices 20 and 30 is displayed on the touch panel 45. The destination device to which the operation input information on the touch panel 45 is sent is also changed along with a change in the display contents source device.

<1-6. Operations>

Figure 8:
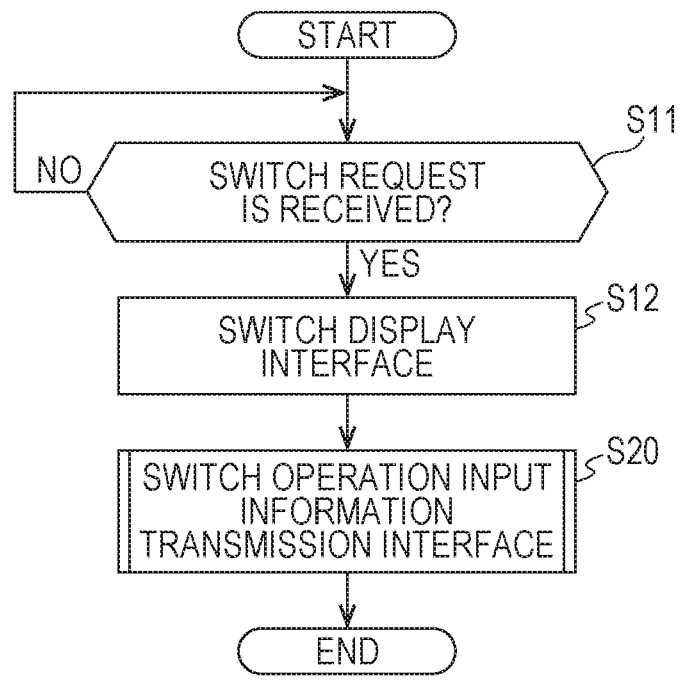
FIG. 8 is a flowchart illustrating operations of a panel controller.
Figure 9:
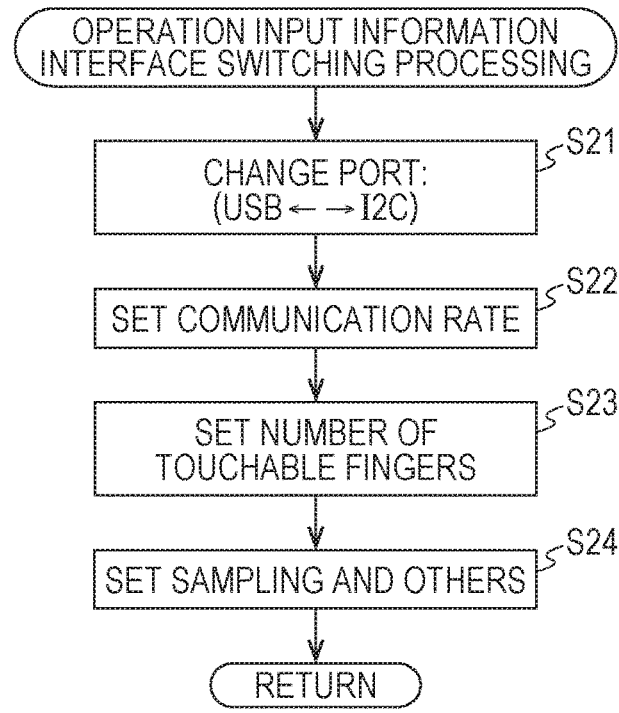
FIG. 9 is a flowchart illustrating operations of the panel controller.

FIG. 8 and FIG. 9 are flowcharts illustrating the operations of the operation display part 40 (the panel controller 41 in detail).

When a switch request is made in the server device 20 or the image forming device 30 in response to a user operation or the like as described above, the switch request is sent (transmitted) from the source device (the server device 20 or the image forming device 30) to the operation display part 40 (via the communication line (which is also called signal line) 55 or the communication line 56). The switch request is transmitted from the source device also to the post-switching device (via a communication line 57 or the like).

When a switch request (switch request of using a different device from a currently-using device) is received in a standby loop in step S11 (FIG. 8), the processing proceeds to step S12.

The description will be made below mainly assuming that a switch request is received from the server device 20 via the communication line 55 (the server device 20 is switched to the image forming device 30). Not limited thereto, reverse switching (switching from the image forming device 30 to the server device 20) may be made. In this case, a reverse changing processing and the like may be performed.

In step S12, the display interface switching processing is performed. In detail, the processing of switching from the display interface 51 of the server device 20 to the interface 52 of the image forming device 30 is performed. Specifically, the panel controller 41 disables the interface 51 (a port for the interface 51 in detail) and enables the interface 52 (a port for the interface 52 in detail). The panel controller 41 (the display control unit 42) receives image data transmitted via the enabled interface 52, and displays an image based on the image data on the touch panel 45. Thereby, a screen (such as the setting screen 230) for the image forming device 30 transmitted from the image forming device 30 is displayed on the touch panel 45.

In step S20, the operation input information interface switching processing is performed. In detail, the processings in steps S21 to S24 are performed (see FIG. 9).

In step S21, an enabled port is changed. Specifically, the panel controller 41 disables a port for the interface 53 (USB interface) of the server device 20, and enables a port for the interface 54 (I2C interface) of the image forming device 30.

The panel controller 41 changes various items of information other than the port information.

In detail, in step S22, a communication rate (data transfer speed) is changed. Specifically, the communication rate of the operation display part 40 is changed from a relatively high communication rate (such as 480 megabits per second (Mbps)) for the server device 20 to a relatively low communication rate (such as 400 kilobits per second (Kbps)) for the image forming device 30.

Further, in steps S23 and S24, the panel controller 41 changes the setting for an operation input information detection operation on the touch panel 45. Thereby, the contents suitable for the post-switching device (the image forming device 30 here) are set.

In step S23, the number of fingers (the number of touchable fingers) identifiable at the same time on the touch panel 45 is changed. Specifically, the number of touchable fingers, which can be output by the operation display part 40, is changed from a relatively large number of touchable fingers (such as 10 fingers) for the server device 20 to a relatively small number of touchable fingers (such as two fingers) for the image forming device 30. Here, the maximum number of fingers identifiable at the same time on the touch panel 45 is assumed at "10". The number of fingers requested as the number of fingers identifiable at the same time (the number of requested fingers) in the server device 20 as relatively universal device is relatively large and is assumed to be equal to the maxim number "10" here. On the other hand, the number of requested fingers in the image forming device 30 (the number of fingers requested as the number of fingers identifiable at the same time) (two fingers here) is less than the number of requested fingers in the server device 20 (10 fingers here).

In step S24, a sampling frequency for detecting a finger operation on the touch panel 45 is changed. Specifically, a relatively high sampling frequency (such as 300 kilohertz (KHz)) for the server device 20 is changed to a relatively low sampling frequency (such as 100 kilohertz (KHz)) for the image forming device 30.

The destination device to which the operation input information on the touch panel 45 (operation panel) is sent is switched (changed) in this way.

When the switching processing ends, the operation input information (such as the touch information) detected in the touch panel 45 is output from the operation display part 40 to the post-switching (post-changing) device. Specifically, the panel controller 41 (the touch information control unit 43) transmits the user operation information sensed on the touch panel 45 to the image forming device 30 via the post-changing interface 54 (the interface 54 for the image forming device 30) (I2C interface). In this way, the information on user operation input is transmitted from the operation display part 40 to the image forming device 30.

After the switching, the operation input information is sent to the destination device via the post-switching interface 54. As described above, the data transfer speed of the post-switching interface 54 is lower than the data transfer speed of the pre-switching interface 53.

The panel controller 41 changes the finger operation control on the touch panel 45 after the switching.

Specifically, the panel controller 41 changes the sampling frequency for detecting a finger operation on the touch panel 45 from a relatively high value (such as 300 kilohertz (KHz)) before the switching to a relatively low value (such as 100 kilohertz (KHz)) after the switching.

Further, the panel controller 41 changes the number of fingers detectable on the touch panel 45 from a relatively high value (such as 10 fingers) before the switching to a relatively low value (such as two fingers) after the switching.

In detail, all the touch information by up to 10 fingers (the operation input information on a relatively large number of fingers) in the touch information detected on the touch panel 45, on which multi-touch by up to 10 fingers can be detected, is sent to the server device 20 via the USB interface 53 before the switching (or when the operation input information is sent to the server device 20).

On the other hand, only the touch information detected by the first two fingers (the operation input information on a relatively small number of fingers) in the touch information detected on the touch panel 45, on which multi-touch by up to 10 fingers can be detected, is sent to the image forming device 30 via the I2C interface 54 after the switching (or when the operation input information is sent to the image forming device 30). In more detail, even if multi-touch by two or more fingers (such as eight fingers) is detected, only the touch information by two fingers is sent to the image forming device 30. The touch information by three or more fingers (such as three to eight fingers) is discarded inside the panel controller 41, and is not output to the image forming device 30.

The operation input information on a relatively small number of fingers is sent via the interface 54 in this way, and the data transfer amount is controlled. Therefore, it is possible to avoid sending a large amount of information from the operation display part 40 to the image forming device 30 via the relatively slow interface 54. Thereby, even if the relatively slow interface 54 is used, it is possible to avoid a deterioration in reaction speed of the touch operation.

Figure 10:
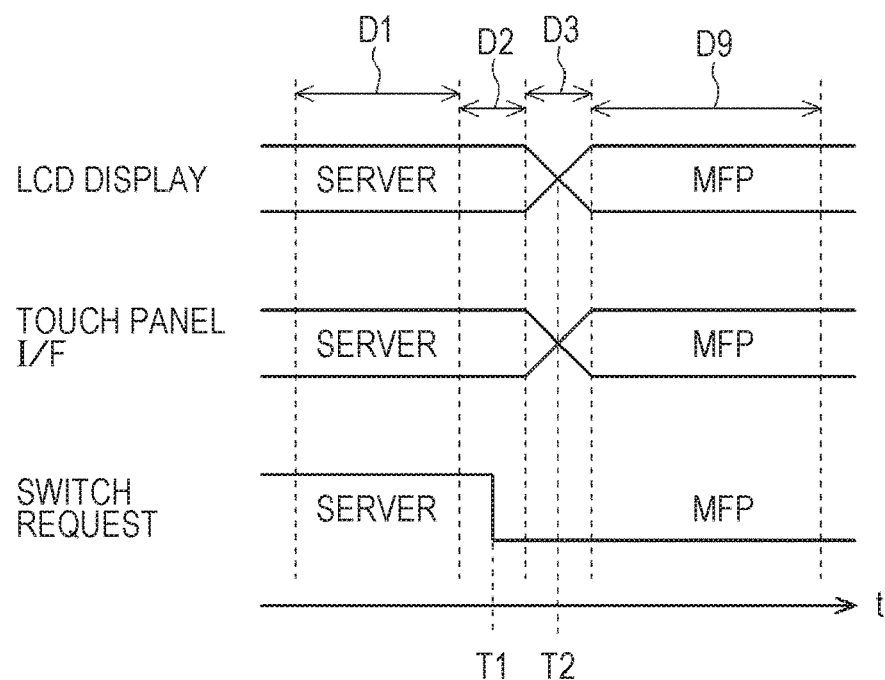
FIG. 10 is a timing chart illustrating a switching operation according to a first embodiment.
Figure 11:
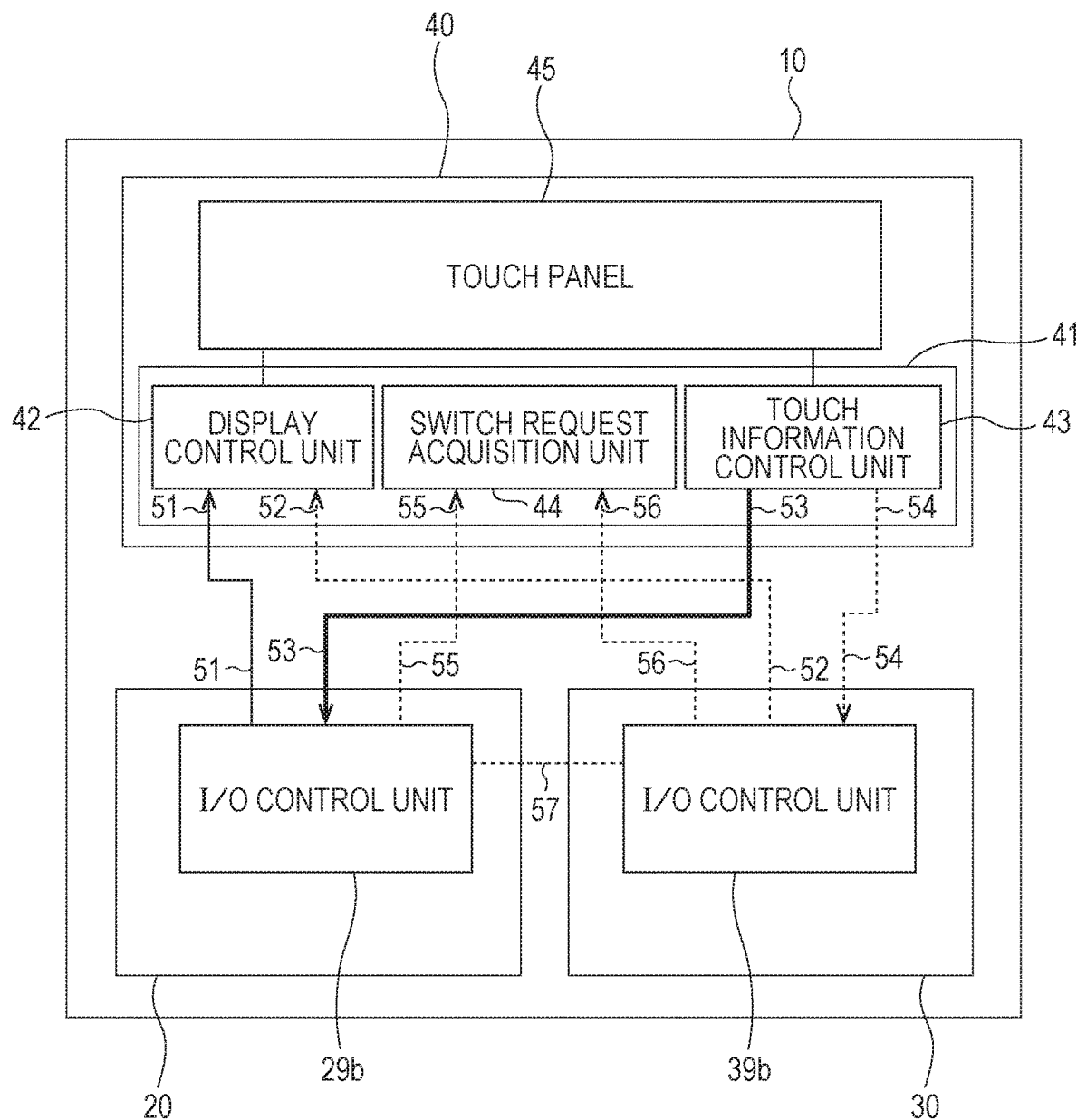
FIG. 11 is an operation diagram when the server device is using.

FIG. 10 is a timing chart illustrating the switching operation. As illustrated in FIG. 10, both the display information source device and the operation input information destination device in the operation display part 40 are the server device 20 in duration D1. In the state, the display data in the touch panel 45 is transmitted from the server device 20 to the operation display part 40 via the interface 51 as illustrated in FIG. 11. Further, the operation input information detected in the touch panel 45 is transmitted from the operation display part 40 to the server device 20 via the interface 53 (USB interface).

Figure 12:
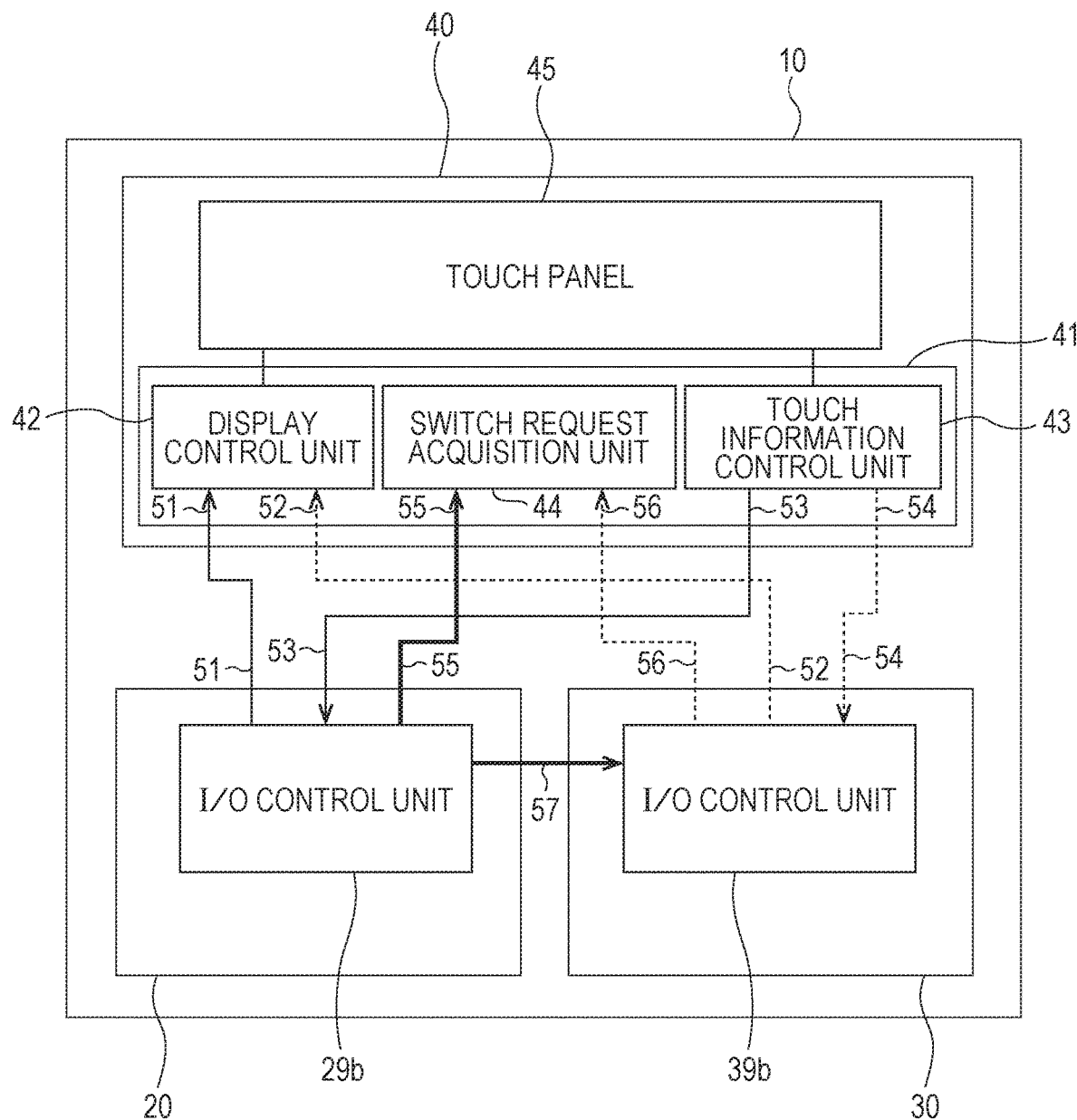
FIG. 12 is a diagram illustrating how notification of a switch request is provided.

In step S11 (at time T1 in duration D2 in detail), the server device 20 transmits a switch request to the operation display part 40 and the image forming device 30 (see also FIG. 12). When the switch request is received by the operation display part 40, in step S12, the operation display part 40 (the panel controller 41) switches the display interface from the interface 51 of the server device 20 to the interface 52 of the image forming device 30 in response to the switch request (at time T2 in duration D3). In step S20, the panel controller 41 switches the operation input information interface in response to the switch request. Specifically, the operation input information interface is switched from the interface 53 of the server device 20 to the interface 54 of the image forming device 30 (at time T2). Here, step S12 and step S20 are assumed to be performed almost at the same time (almost at time T2).

Figure 13:
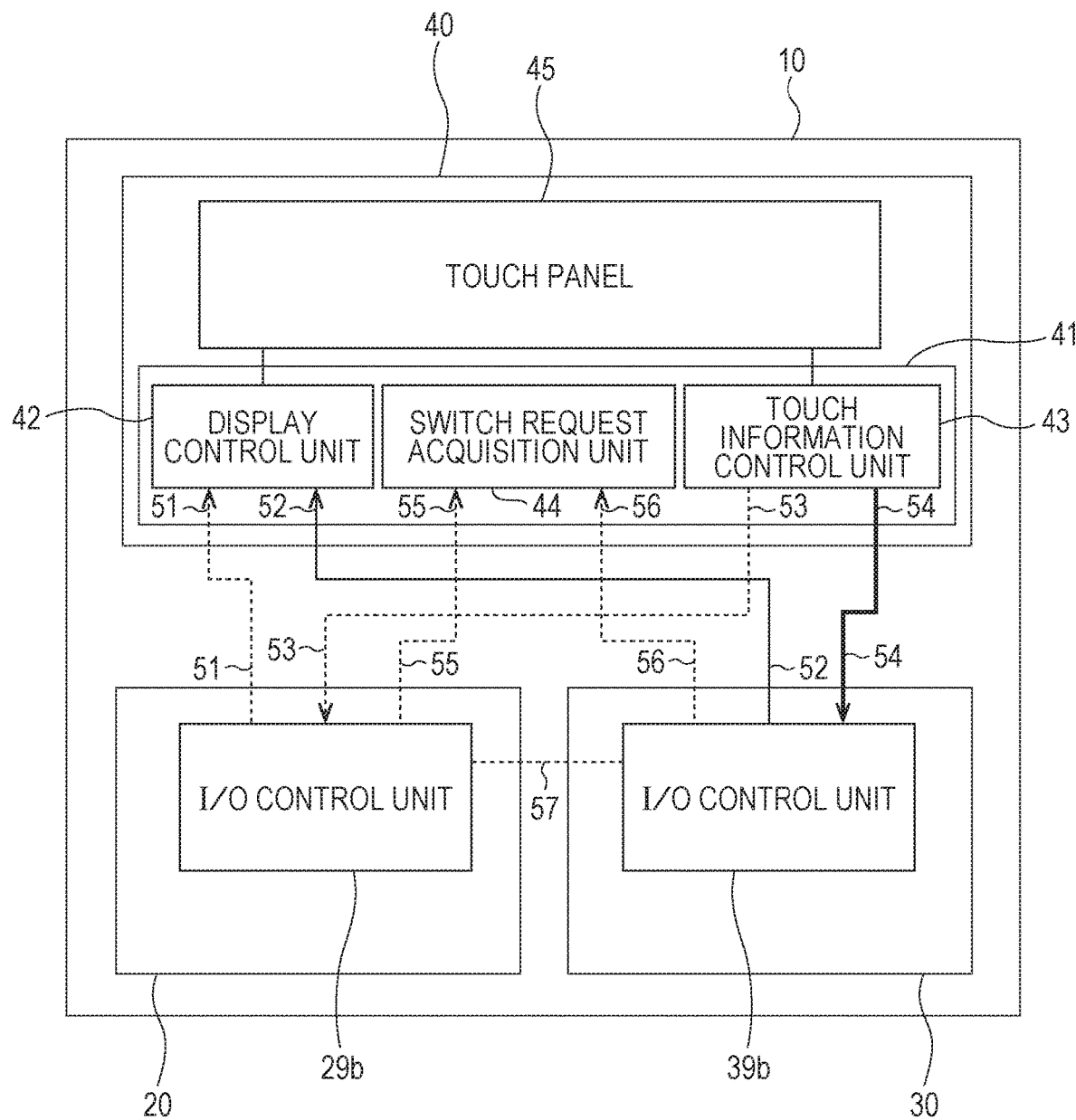
FIG. 13 is an operation diagram when the image forming device is using.

Thereafter, in duration D9, an image from the image forming device (MFP device) 30 (image generated by the image forming device 30 that receives the switch request from the server device 20) is displayed on the touch panel 45, and the operation input information detected in the touch panel 45 is sent to the image forming device 30. More specifically, the display data in the touch panel 45 is transmitted from the image forming device 30 to the operation display part 40 via the interface 52 as illustrated in FIG. 13. The touch information (such as the number of touchable fingers and touch position of each touchable finger) detected on the touch panel 45 is transmitted from the operation display part 40 to the image forming device 30 via the interface 54 (I2C interface).

With the above operations, both the display information source device and the operation input information destination device in the operation display part 40 are appropriately switched from the server device 20 to the image forming device 30.

In particular, the destination device to which the operation input information from the operation display part 40 is sent, and the like are dynamically changed in response to a switch request. Specifically, when a switch request is received, the source device from which the display contents (display data) on the touch panel 45 are sent is changed, and the destination device to which the operation input information on the touch panel 45 is sent is changed. In particular, the operation input information on the touch panel 45 is sent to the post-changing destination device by use of the post-changing interface (such as the I2C interface 54) corresponding to the post-changing destination device (such as the image forming device 30). Therefore, when the devices 20 and 30 are provided in the MFP 10 and the operation display part 40 is shared by the devices 20 and 30, it is not necessary to use a common type of interfaces (53 and 54) for transmitting the operation input information from the operation display part 40 to each of the devices 20 and 30.

Figure 14:
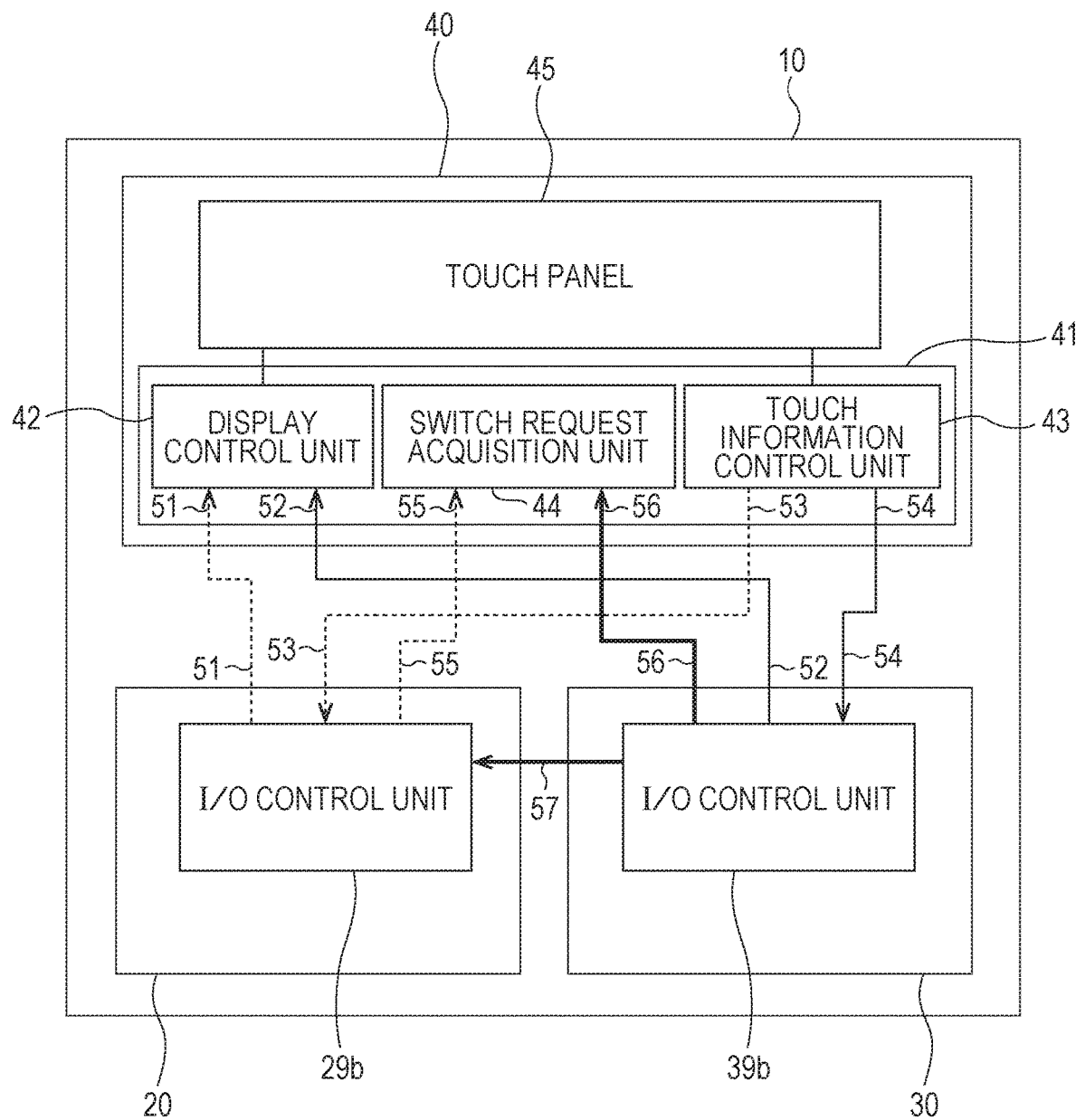
FIG. 14 is a diagram illustrating how notification of a reverse switch request is provided.

To the contrary, when a switch request is received from the image forming device 30 to the server device 20, a reverse operation may be performed. Accordingly, both the display information source device and the operation input information destination device in the operation display part 40 are switched from the image forming device 30 to the server device 20. Specifically, the state in FIG. 13 may transit to the state in FIG. 11 via the state in FIG. 14. FIG. 14 illustrates a situation in which the image forming device 30 transmits a switch request (switch request of switching a using device from the image forming device 30 to the server device 20) to the operation display part 40 and the server device 20.

2. Second Embodiment

The first embodiment has been described assuming that the display information source device in the operation display part 40 is immediately switched in response to a switch request and an image from the post-switching source device (such as the image forming device) is displayed on the touch panel 45 as illustrated in FIG. 10.

However, actually, even if the source device is immediately switched (step S12) in response to a switch request, it takes a certain time to perform the processing of generating image data of an image (image to be displayed after switching (updated image)) for the post-switching device. Thus, the display on the touch panel 45 is not immediately updated.

Specifically, the post-switching device (here the image forming device) 30 starts generating image data (display data) of a post-switching image when receiving a switch request, and writes the generated display data in the image memory in the image forming device 30. The generation processing including the display data writing processing takes a certain time (about several hundred milliseconds, for example). After the generation processing including the processing of writing into the image memory is completed (T3 (see FIG. 15) when the display data is completely updated (at the time of update completion)), the updated display data can be displayed. In detail, the updated display data is transmitted from the image forming device 30 to the operation display part 40 via the post-switching display interface 52, and a screen (updated screen) based on the display data is displayed on the touch panel 45. The update completion time T3 is expressed as display image's update data generation completion time.

Figure 15:
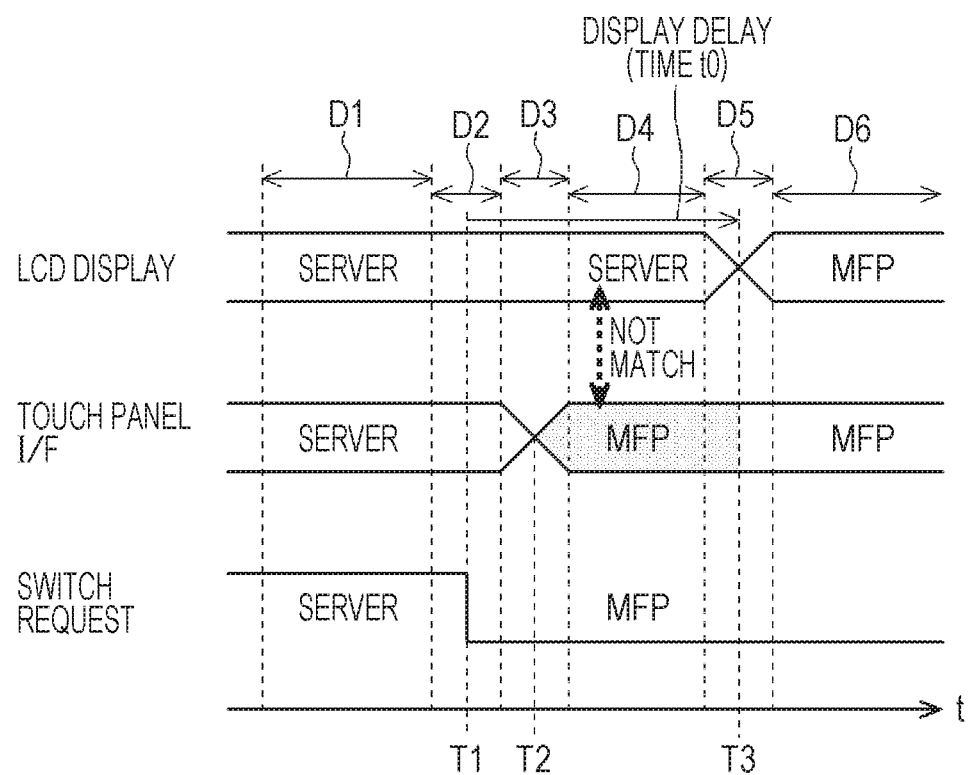

The display of an updated image is delayed in a duration (which is also called display delay duration) between switch request time T1 and update completion time T3 (see FIG. 15).

When the display contents source device is immediately switched to the image forming device 30 in response to a switch request, the processing of generating new display data (display data for an updated screen) is not completed in the display delay duration. Thus, not the "updated screen" for the post-switching device 30 but the "pre-updated screen" for the post-switching device 30 is displayed. For example, the display screen displayed on the touch panel 45 at the end of the duration in which the post-switching device (image forming device) 30 is previously operating as using device is displayed on the touch panel 45 in the display delay duration.

It is preferable to avoid the display since the display causes user's disturbance, To the contrary, there is considered a technique in which the source device from which the display contents of the touch panel 45 are sent is not changed (not switched) at time T2 and is changed (switched) at update display completion time T3 even if a switch request is received at time T1 as illustrated in FIG. 15. Specifically, the switching from the display interface 51 corresponding to the pre-switching device 20 to the display interface 52 corresponding to the post-switching device 30 is postponed to time T3. Accordingly, the screen of the pre-switching device (server device) 20 is continuously displayed on the touch panel 45 from time T1 to time T3, and the screen of the post-switching device (image forming device) 30 (and the updated screen) is displayed on the touch panel 45 after time T3. Thereby, the "pre-updated" screen of the image forming device 30 is avoided from displaying in the display delay duration (from time T1 to time T3).

If the operation input information destination device is changed from the server device 20 to the image forming device 30 at time T2 similarly as in the first embodiment when the display operation is performed, the following problems occur.

Figure 16:
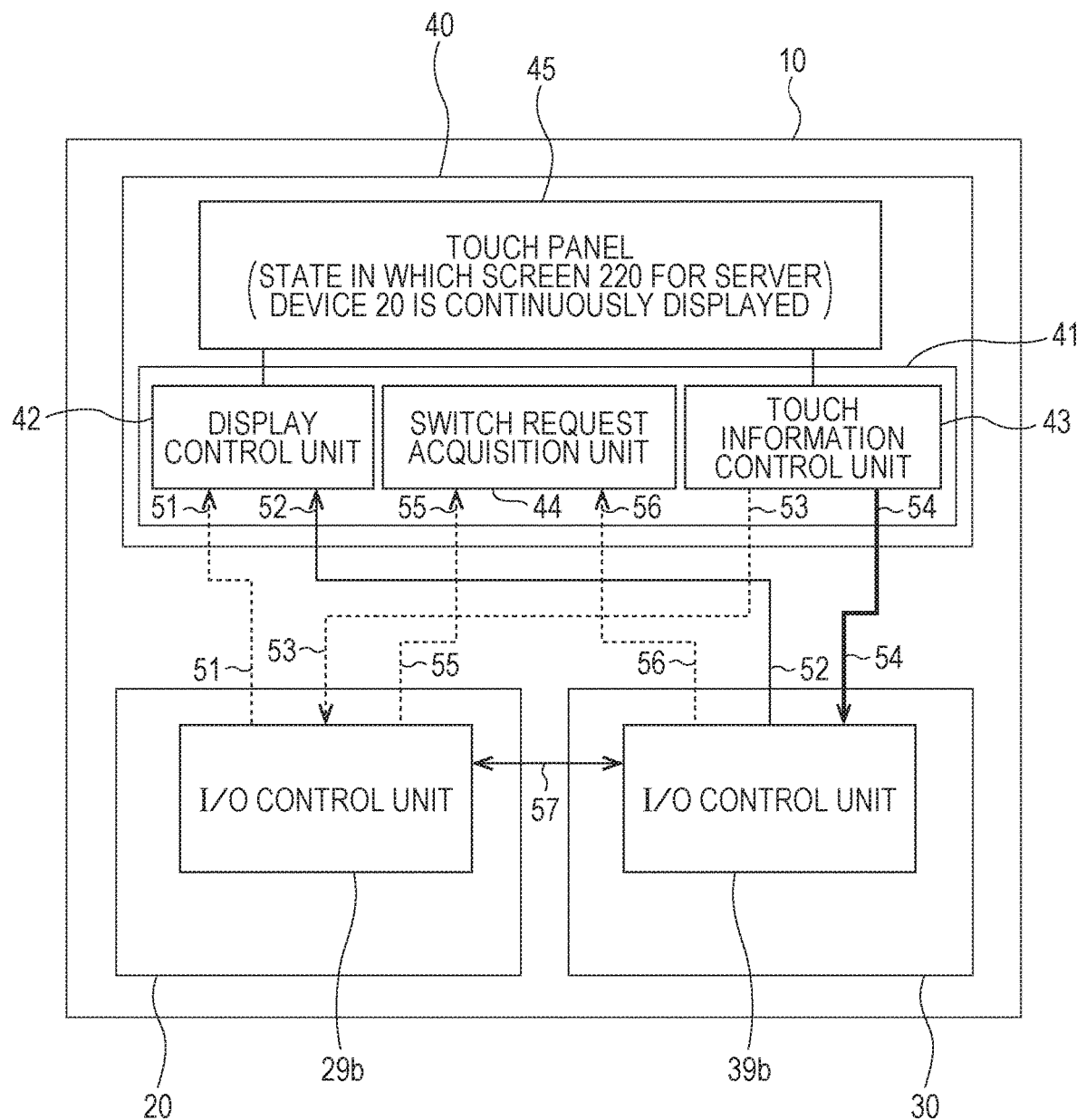

As describe above, the updated screen (screen for the image forming device 30) is not displayed on the touch panel 45 between time T1 and time T3 and the pre-switching screen (screen (220 or the like) for the server device 20) is continuously displayed (particularly in duration D4 (see FIG. 15)) (see also FIG. 16).

On the other hand, the touch information and the like detected on the touch panel 45 are transmitted from the panel controller 41 to the image forming device 30 (post-switching device) via the interface 54 after the device switching (particularly in duration D4) (see also FIG. 16). That is, the touch information and the like are transmitted to the image forming device 30 between time T2 and time T3.

However, the image forming device 30 has a problem that it cannot determine association between touch information and display information (it cannot identify which button in the display screen the operation is performed on) even if it receives the touch information from the operation display part 40 in the state. There can occur a problem caused by the fact that the source device (the server device 20) (previously-using device) from which the screen being displayed is sent does not match with the destination device (the image forming device 30) (newly-using device) to which the touch information and the like are sent due to display delay of the new display screen (screen for the newly-using device 30) in this way.

FIG. 15 and FIG. 16 are diagrams illustrating the problems according to the first embodiment. FIG. 15 illustrates that the source device from which the screen being displayed is sent (the server device 20) does not match with the destination device to which the touch information and the like are sent (the image forming device 30 (denoted as "MFP" in the Figure)) in duration D4. Further, FIG. 16 illustrates a state in which the operation input information on the touch panel 45 is transmitted from the operation display part 40 to the image forming device 30 (post-switching using device) while the screen 220 for the server device 20 (pre-switching using device) is continuously displayed on the touch panel 45 between time T2 and time T3 (see FIG. 15).

Thus, a technique capable of eliminating the problems will be described according to a second embodiment.

The second embodiment is a variant of the first embodiment, and the differences from the first embodiment will be mainly described below.

Figure 17:
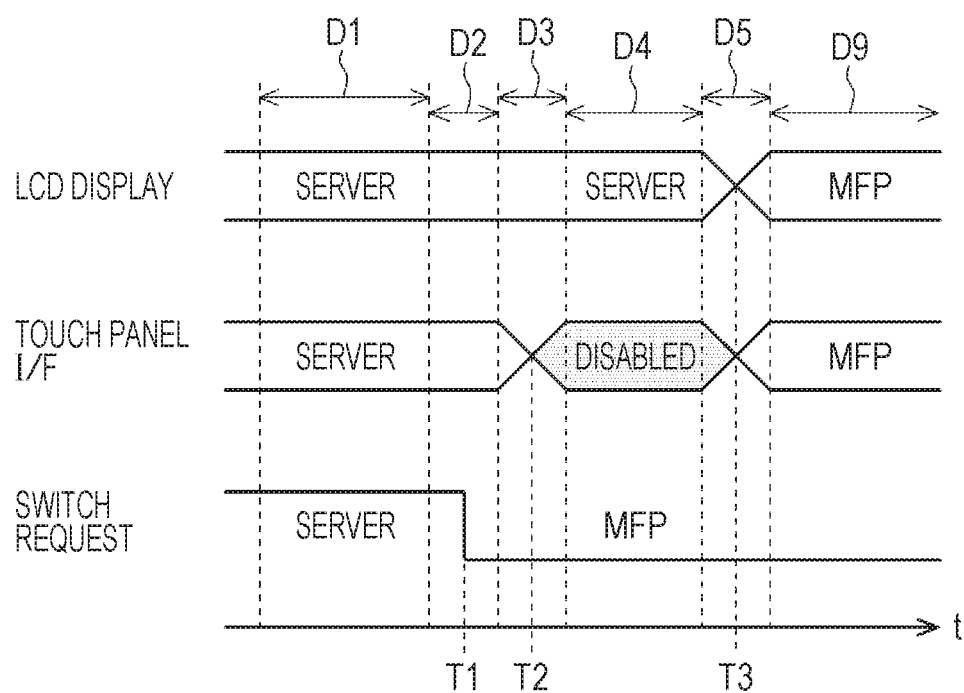
FIG. 17 is a timing chart illustrating operations according to a second embodiment.

According to the second embodiment, the panel controller 41 disables the operation input information received in the touch panel 45 between time T2 immediately after reception of a switch request and time T3 when the display data on the operation panel is completely updated (when the display data update processing is completed by the post-switching device), and sends the operation input information in the duration to neither the device 20 or 30 (see FIG. 17 and the like). The panel controller 41 then sends the operation input information received in the touch panel 45 after update completion time T3 to the post-changing destination device (post-switching device) (the image forming device 30 here).

Figure 18:
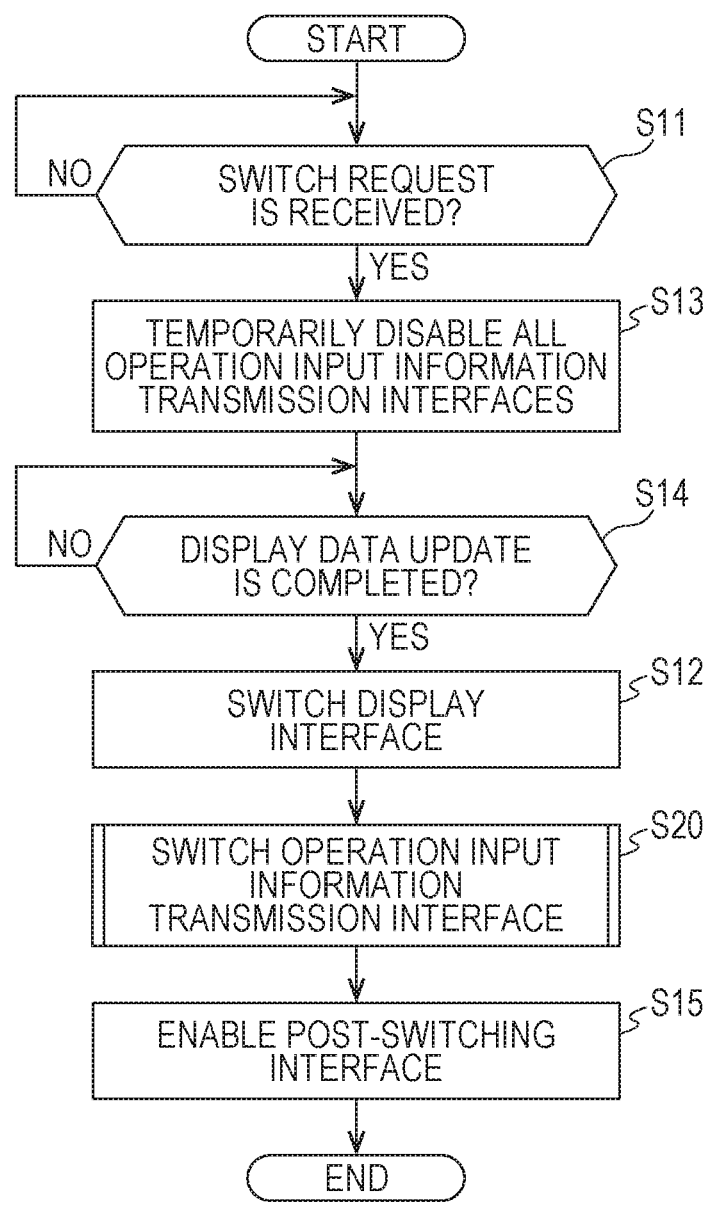
FIG. 18 is a flowchart illustrating operations of the panel controller according to the second embodiment.

FIG. 17 is a timing chart illustrating operations according to the second embodiment, and FIG. 18 is a flowchart illustrating operations according to the second embodiment (operations of the panel controller 41).

As illustrated in FIG. 18, the similar operations as in the first embodiment are performed up to step S11. Specifically, the server device 20 transmits a switch request (request of switching from the server device 20 to the image forming device 30) to the operation display part 40. The panel controller 41 receives the switch request from the server device 20 in step S11 (at time T1). Further, as illustrated in FIG. 12, the server device 20 transmits a switch request (which is also called display data update request) from the server device 20 also to the post-switching device (image forming device) 30. When receiving the update request, the image forming device 30 starts the display data update processing (processing of writing image data in the image memory in the image forming device 30) in response to the update request.

Steps S12 and S20 are performed after steps S13 and S14 unlike in the first embodiment (see FIG. 8).

In step S13 after step S11, the panel controller 41 temporarily disables both the operation input information interfaces 53 and 54 in response to the switch request (at time T2). At this time (at time T2), the image forming device 30 does not finish writing new image data (screen data for the image forming device 30) (updated display data) in the image memory in the image forming device 30. Further, the panel controller 41 still uses the interface 51 for the pre-switching device 20 as a display interface at time T2 (to time T3). Thus, the screen for the server device 20 keeps being displayed on the touch panel 45.

The panel controller 41 then waits for the post-switching device (image forming device 30) to complete display data update in the standby loop in step S14.

The completion of display data update may be determined by an elapse of predetermined time t0 (see FIG. 15) from time T1 (switch request reception time), for example. The predetermined time t0 is assumed to be predefined as a time required for the screen data writing processing. Alternatively, not limited thereto, notification of the completion of display data generation (update completion notification signal) is provided (sent) from the image forming device 30 to the operation display part 40, and the completion of display data update may be determined in response to reception of the generation completion.

When the display data update is completed (the image forming device 30 (post-switching device) completes the processing of writing in the memory, or the like in detail) (at time T3), the processing proceeds from step S14 to step S12 (see FIG. 18).

The similar operations as in the first embodiment are performed in steps S12 and S20.

In step S12, the display interface switching processing is performed. In detail, the processing of switching from the display interface 51 for the server device 20 to the interface 52 for the image forming device 30 is performed (at time T3). With the switching processing, a screen for the post-switching device (the image forming device 30 here) is displayed on the touch panel 45 after time T3.

In step S20 and its next step S15, the operation input information interface switching processing is performed (at time T3). In detail, in step S20, the processing of switching from the USB interface 53 for the server device 20 to the I2C interface 54 for the image forming device 30 (various setting change processings and the like in detail) is performed. In step S15, only the post-switching interface (the I2C interface 54 here) is enabled among all the operation input information transmission interfaces disabled in step S13. With the switching processing, the operation input information input in the touch panel 45 is sent to the post-switching device (the image forming device 30 here).

Steps S12, S20, and S15 are performed almost at the same time (almost at time T3 here).

As described above, the operation input information received in the touch panel 45 is disabled in the duration between time T2 immediately after reception of a switch request and display data update completion time T3. The operation input information in the duration (disabled duration) is sent to neither the device 20 or 30.

The post-switching interface (the I2C interface 54 here) out of the two disabled interfaces 53 and 54 is enabled by the processings in steps S20 and S15. The operation input information (such as touch information) received in the touch panel 45 is sent to the post-changing destination device (the image forming device 30 here). In particular, reception of the operation input information by the touch panel 45 is restarted in response to the display data update completion (at time T3). The operation input information received in the touch panel 45 is sent to the post-changing destination device (the image forming device 30) after update completion time T3.

With the processing, both the operation input information interfaces 53 and 54 are disabled in the duration including duration D4 (between time T2 and time T3) in FIG. 17. The operation display part 40 does not send the operation input information to any device in the disabled duration (from T2 to T3). The operation input information interface is changed to the post-switching interface at time T3 when the display data update is completed. Specifically, the interface 53 for the server device 20 is switched to the interface 54 for the image forming device 30 (at time T3). Thereafter, the similar operations as in the first embodiment are performed in duration D9.

Accordingly, the operation input information (which is likely to be for the server device 20) in the touch panel 45 is disabled in duration D4, and is not transmitted from the operation display part 40 to the image forming device 30. Thus, the operation input information meaningless to the image forming device 30 (insignificant operation input information) can be avoided from receiving by the image forming device 30. The above problems (problems caused by the fact that the source device from which the screen being displayed is sent does not match with the destination device to which the touch information and the like are sent) can be solved in this way.

3. Third Embodiment

A third embodiment is a variant of the first embodiment and the second embodiment. The differences from the first and second embodiments will be mainly described below.

According to the second embodiment, both the pre- and post-switching interfaces 53 and 54 are disabled between time T2 and time T3. Thereby, unnecessary operation input information is avoided from transmitting from the operation display part 40 to the image forming device 30.

According to the third embodiment, the disabling processing is not performed in the operation display part 40 (unlike in the second embodiment), and unnecessary operation input information is transmitted to the image forming device 30 in the duration between time T2 and time T3. However, the image forming device 30 discards the operation input information received in the duration.

Figure 19:
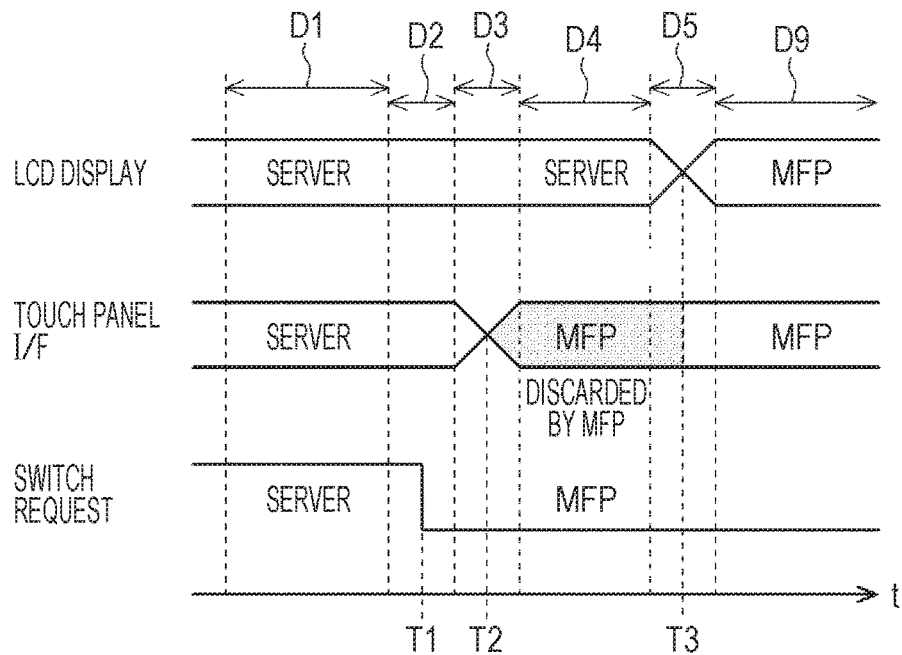
FIG. 19 is a timing chart illustrating operations according to a third embodiment.
Figure 20:
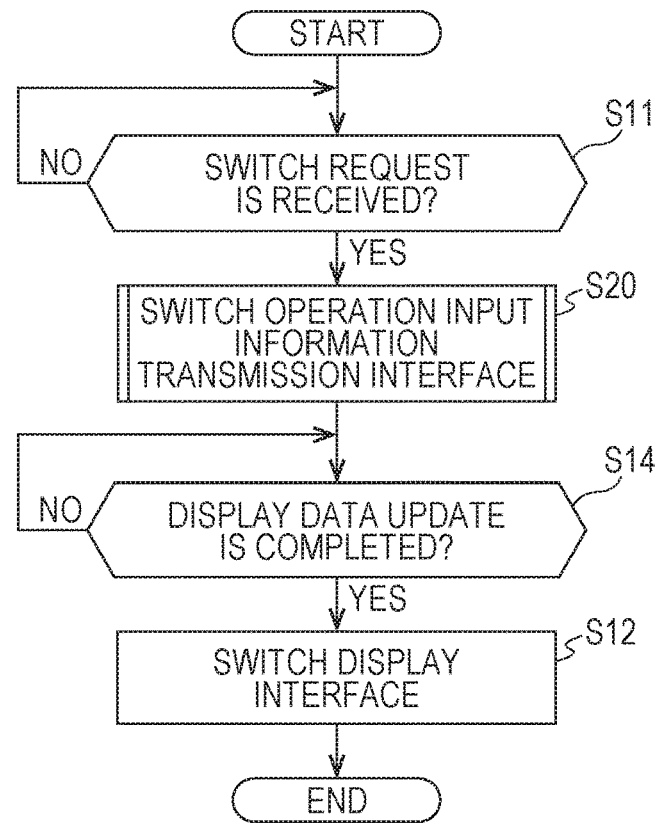
FIG. 20 is a flowchart illustrating operations of the panel controller according to the third embodiment.

FIG. 19 is a timing chart illustrating operations according to the third embodiment, and FIG. 20 is a flowchart illustrating operations according to the third embodiment (operations of the panel controller 41).

According to the third embodiment, the panel controller 41 performs the similar operations as in the first embodiment (see FIG. 20). The disabling processing for an operation input information destination device (step S13), and the like are not performed Specifically, according to the third embodiment, the operations in steps S13 and S15 in FIG. 18 are not performed. The operations in steps S1, S20, S14, and S12 in FIG. 18 are performed in this order. In detail, as illustrated in FIG. 19 and FIG. 20, the switching processing in step S20 (the processing of switching the operation input information destination device) is performed in response to a switch request (step S11) (at time T2), and the switching processing in step S12 (the processing of switching the display contents source device) is performed when completion of display data update is determined in step S14 (at time T3). Similarly as in FIG. 15, the operation input information is sent to the image forming device 30 (denoted as "MFP" in the Figure) between time T2 and time T3 in FIG. 19.

However, the image forming device 30 discards the operation input information transmitted from the operation display part 40 (the panel controller 41) via the post-changing interface 54 in the duration (duration corresponding to the disabled duration according to the second embodiment) between when a switch request is received from the server device 20 (at time T2) (see FIG. 12 and FIG. 19) and when the predetermined time t0 elapses (at time T3). In other words, the image forming device 30 discards the operation input information received in the touch panel 45 in the duration between time T2 immediately after reception of a switch request and update completion time T3.

The above problems (problems caused by the fact that the source device from which a screen being displayed is sent does not match with the destination device to which the touch information and the like are sent) can be solved according to the form similarly as in the second embodiment. In detail, the operation input information (operation input information meaningless to the image forming device 30) received by the post-switching destination device 30 is discarded between time T2 and time T3, and thus the operation input information meaningless to the image forming device 30 (post-switching device) is appropriately handled.

4. Fourth Embodiment

A fourth embodiment is a variant of the third embodiment and the like. The differences from the third embodiment and the like will be mainly described below.

The panel controller 41 switches the operation input information interface at time T2 immediately after reception of a switch request according to the first embodiment and the third embodiment.

According to the fourth embodiment, the panel controller 41 switches the operation input information interface to the post-switching interface (the I2C interface 54) in response to display data update completion (at time T3). In other words, the operation input information destination device is changed not at time T2 immediately after reception of a switch request but at time T3 after the display data update is completed.

Figure 21:
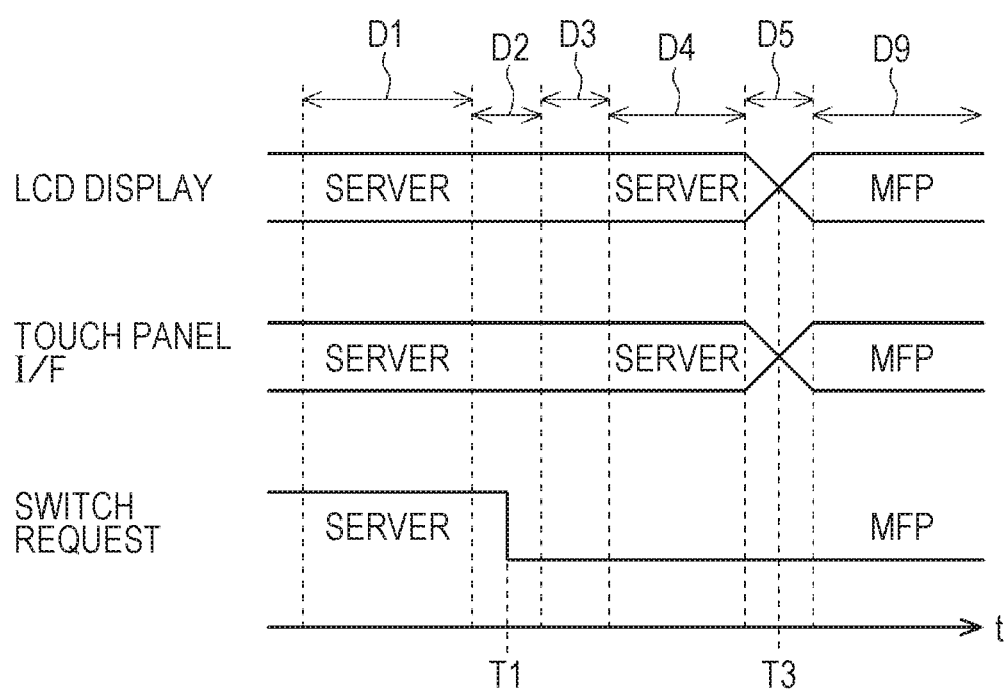
FIG. 21 is a timing chart illustrating operations according to a fourth embodiment.
Figure 22:
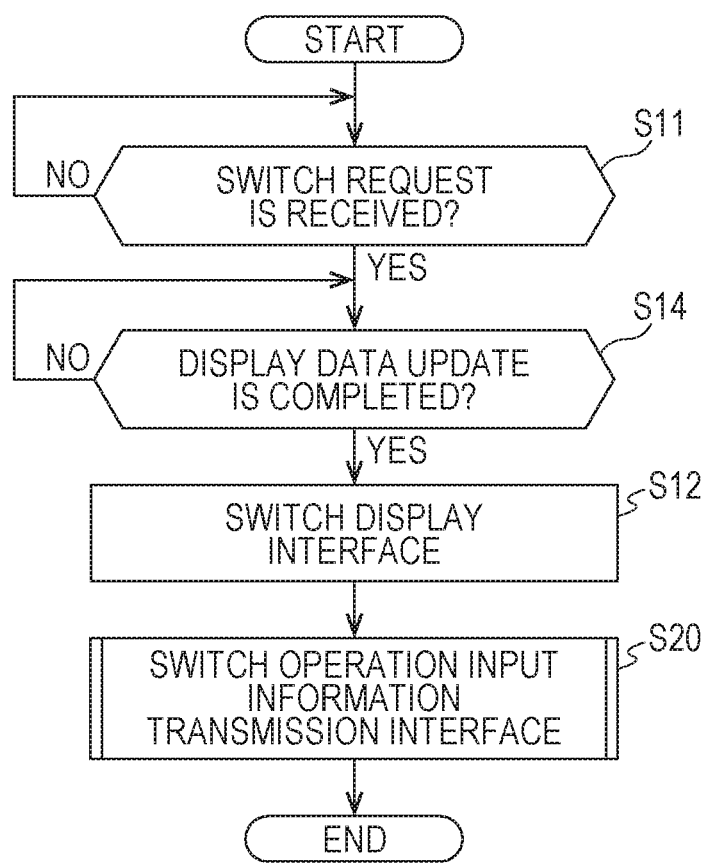
FIG. 22 is a flowchart illustrating operations of the panel controller according to the fourth embodiment.

FIG. 21 is a timing chart illustrating operations according to the fourth embodiment, and FIG. 22 is a flowchart illustrating operations according to the fourth embodiment (operations of the panel controller 41).

As illustrated in FIG. 22, the operations are similar as in the third embodiment (see FIG. 20) except the execution timing of step S20. According to the fourth embodiment, the processing in step S20 is performed (in addition to the processing in step S12) when completion of display data update is determined in step S14.

Specifically, when a switch request is received in step S11, the processing proceeds to step S14, where the panel controller 41 waits for completion of display data update in the standby loop in step S14.

When the display data update processing is completed (at time T3), the processing proceeds to step S12.

In step S12, the display interface switching processing is performed. In detail, the processing of switching from the display interface 51 for the server device 20 to the interface 52 for the image forming device 30 is performed. With the switching processing, a screen for the post-switching device (the image forming device 30 here) is displayed on the touch panel 45 (at time T3).

In step S20, the operation input information interface switching processing is performed. Specifically, the operation input information interface is changed to the post-switching interface (the I2C interface 54) (at time T3). In this way, the destination device to which the operation input information on the touch panel 45 is sent is changed in response to completion of display data update.

Steps S12 and S20 are performed almost at the same time (almost at time T3).

The operation input information received in the touch panel 45 after update completion time T3 is sent to the post-changing destination device 30 via the post-changing interface 54.

With the operation, the touch panel 45 is in the state in which the display screen (update-completed screen) for the post-switching device (the image forming device 30 here) is being displayed after time T3 (particularly in duration D9) in the duration after reception of a switch request, and the operation input information (such as touch information) on the touch panel 45 is transmitted to the post-switching device. In other words, the source device from which the screen being displayed is sent matches with the destination device to which the operation input information is sent.

The touch panel 45 is in the state in which the display screen (pre-updated screen) for the pre-switching device (the server device 20 here) is being displayed in the duration between time T1 and time T3 (particularly in duration D4), and the operation input information (such as touch information) on the touch panel 45 is transmitted to the pre-switching device. That is, the source device from which the screen being displayed is sent matches with the destination device to which the operation input information is sent. In other words, the operation input information (the operation input information for the server device 20) received in the duration before display data update completion time T3 is transmitted to the pre-switching destination device (the server device 20) which is a previous device to which the operation input information is sent (without violating user's intention). Thus, it is possible to avoid mismatch between the source device from which the screen being displayed is sent and the destination device to which the touch information and the like are sent.

The operation input information based on a user operation on the touch panel 45 may be handled as valid information also in the duration between time T1 and time T3 according to the form. Specifically, the operation input information based on a user operation on the touch panel 45 may be transmitted from the operation display part 40 to the server device 20 in the duration between time T1 and time T3.

5. Fifth Embodiment

A fifth embodiment is a variant of the fourth embodiment. The differences from the fourth embodiment and the like will be mainly described below.

Figure 23:
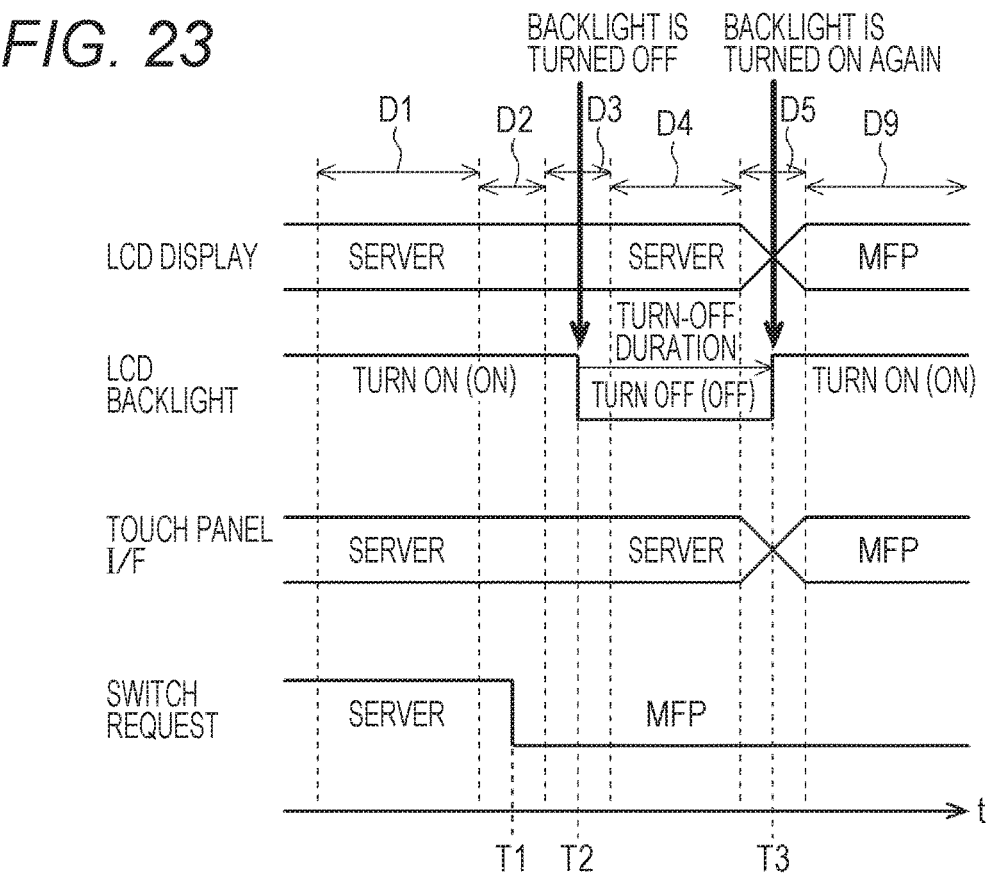
FIG. 23 is a timing chart illustrating operations according to a fifth embodiment.

FIG. 23 is a timing chart illustrating operations according to the fifth embodiment. The fifth embodiment will be described with reference to FIG. 23.

According to the fifth embodiment, the similar operations as in the fourth embodiment are basically performed. For example, the panel controller 41 switches the operation input information interface to the post-switching interface (the I2C interface 54) in response to completion of display data update (at time T3). In other words, the operation input information destination device is changed not at time T2 immediately after reception of a switch request but at time T3 after completion of display data update.

An additional operation is performed according to the fifth embodiment in addition to the operations according to the fourth embodiment.

Specifically, the panel controller 41 keeps the touch panel 45 (its backlight in detail (backlight of the liquid crystal display panel)) in the off state (turn-off state) in the duration between time T2 immediately after reception of a switch request and display data update completion time T3.

In detail, the panel controller 41 turns off the touch panel 45 in response to a which request (at time T2). The panel controller 41 turns on the backlight again in response to completion of display data update (at time T3), and changes the destination device to which the operation input information on the touch panel 45 is sent (at time T3). The operation input information received in the touch panel 45 after the backlight is turned on again is sent to the post-changing destination device 30.

In the above operations, the touch panel 45 is tuned off in response to a switch request and the display screen of the touch panel 45 is not presented to the user in the turn-off duration so that the user operation itself can be restricted in the turn-off duration. Therefore, the problem of mismatch in the turn-off duration (the source device from which the screen being displayed is sent does not match with the destination device to which the operation input information is sent) can be avoided.

According to the embodiment, if the operation input information received in the touch panel 45 is present until just before the backlight is turned on again, the operation input information is sent to the pre-changing destination device (the server device 20). However, the present invention is not limited thereto.

For example, the panel controller 41 disables the operation input information received in the touch panel 45 in the duration (between time T2 and time T3) in which the touch panel 45 is turned oft and may send the operation input information in the turn-off duration to neither the device 20 or 30. The panel controller 41 may restart sending the operation input information when the backlight of the touch panel 45 is turned on again. Specifically, the panel controller 41 may send the operation input information received in the touch panel 45 after the backlight is turned on again (after time T3) to the post-changing destination device (such as the image forming device 30).

According to the modified example, the operation input information received in the operation panel in the turn-off duration is disabled, and the operation input information in the duration is sent to neither the device 20 or 30. The operation input information input in the turn-off duration is likely to be meaningless to any device, and the operation input information can be avoided from sending to any device.

6. Sixth Embodiment

A sixth embodiment is a variant of the second embodiment and the like. The differences from the second embodiment will be mainly described below.

According to the sixth embodiment, when a series of operations inputs is performed immediately after reception of a switch request (at time T2), the panel controller 41 does not change the destination device to which the operation input information on the touch panel 45 is sent until the series of operation inputs is completed. After the series of operation inputs is completed (at time T3 after the end of the disabled duration according to the sixth embodiment in detail), the panel controller 41 changes the destination device to which the operation input information on the touch panel 45 is sent.

Figure 24:
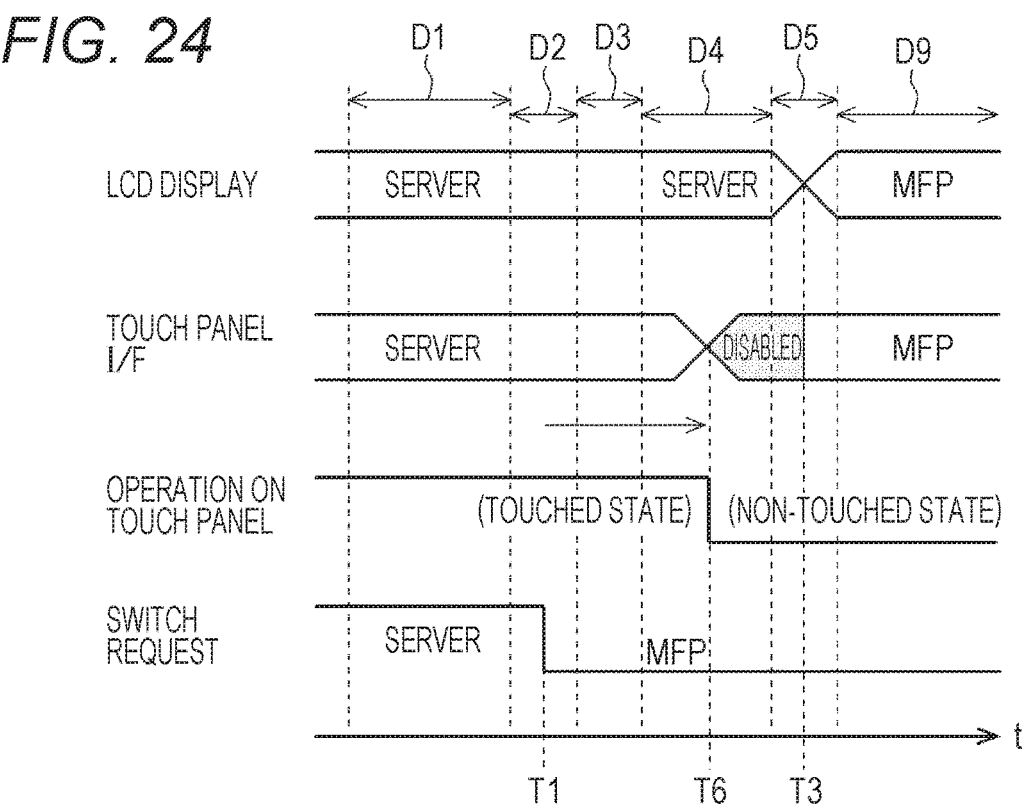
FIG. 24 is a timing chart illustrating operations according to a sixth embodiment.
Figure 25:
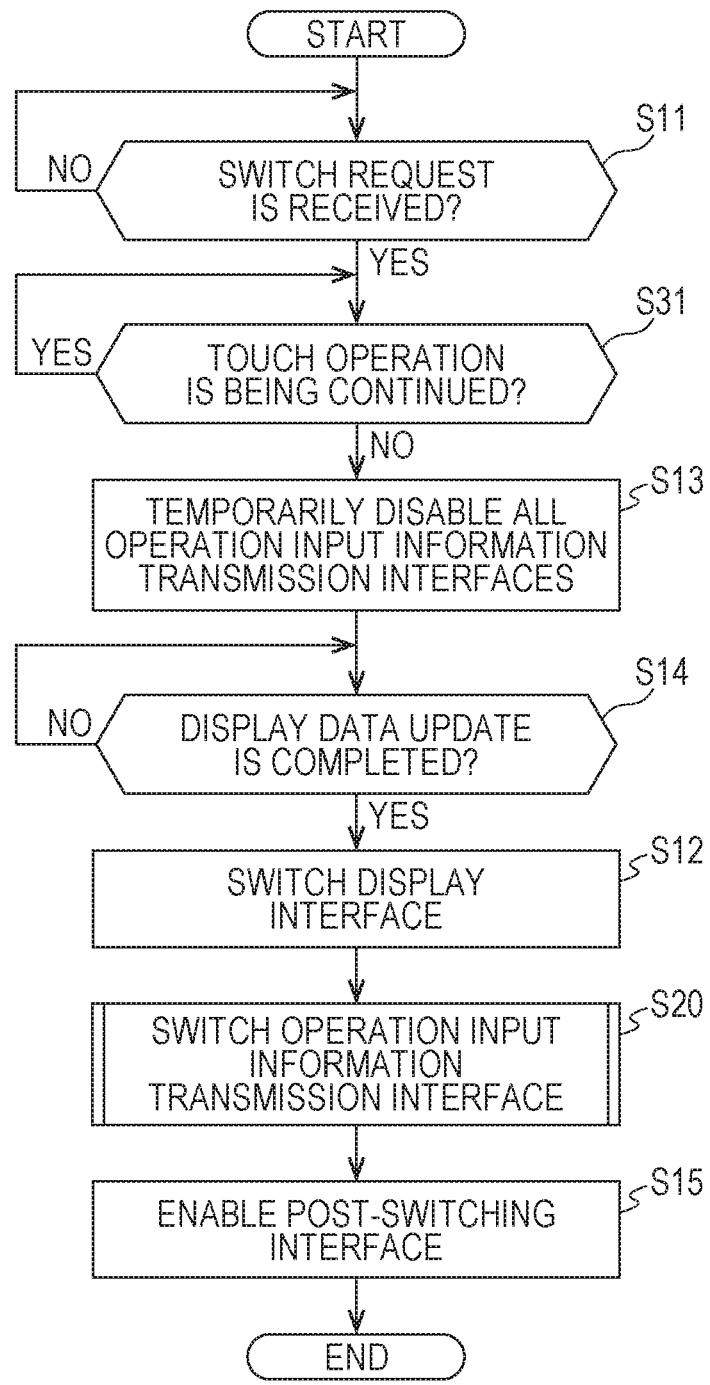
FIG. 25 is a flowchart illustrating operations of the panel controller according to the sixth embodiment.

FIG. 24 is a timing chart illustrating operations according to the sixth embodiment, and FIG. 25 is a flowchart illustrating operations according to the sixth embodiment (operations of the panel controller 41).

As can be seen by comparison between FIG. 25 according to the sixth embodiment and FIG. 18 according to the second embodiment, the processing in step S31 is added after step S11 according to the sixth embodiment.

As can be seen by comparison between FIG. 24 according to the sixth embodiment and FIG. 17 according to the second embodiment, the operation input information (such as touch information) is continuously sent to the pre-switching device (the server device 20) not until time T2 but until later time T6 (when the series of operation inputs is completed) according to the sixth embodiment. In other words, the destination device to which the operation input information on the touch panel 45 is sent is not changed until time T6 when the series of operation inputs is completed. Here, a series of operations (such as long-tap operation or drag operation) already started at switch request reception time T1 is assumed to be completed at time T6 (to be continued to time T6).

Thereby, when a series of operations started on the operation screen for the pre-switching device (the server device 20) is continued to time T6, the operation input information on the series of operations (operations continued over a certain period of time) can be accurately sent to the pre-switching destination device (the server device 20 here) as previous destination device until the series of operations is completed (at time T6).

Further, a subsequent disabled duration (buffer duration) is provided (similarly as in the second embodiment), and thus the operation input information is not sent to the post-switching device (the image forming device 30) in the disabled duration (between time T6 and time T3). Thus, the operation input information meaningless to the image forming device 30 (unnecessary operation input information) can be avoided from receiving in the image forming device 30.

The destination device to which the operation input information on the touch panel 45 is sent is changed after time T6 when the series of operation inputs is completed and immediately after T3 at the end of the disabled duration. Specifically, the operation input information on the touch panel 45 is sent to the post-changing destination device 30 via the post-changing interface 54 corresponding to the post-changing destination device 30.

The operation input information on the touch panel 45 is sent to the post-changing device after time T3 when the series of operation inputs is completed and the disabled duration ends according to the sixth embodiment, but is not limited thereto. For example, the operation input information on the touch panel 45 may be sent to the post-changing device (the image forming device 30) immediately after time T6 when the series of operation inputs is completed. In this case, it is preferable that the device (the image forming device 30) that receives unnecessary operation input information between time T6 and time T3 discards the operation input information received in the duration (unnecessary operation input information) similarly as in the third embodiment.

6. Variant and Others

The embodiments of the present invention have been described above, but the present invention is not limited to the aforementioned contents.

For example, according to each of the above embodiments, the panel controller 41 receives a switch request of changing the destination device to which the operation input information on the touch panel 45 is sent to the post-switching device from the "pre-switching device" (the server device 20), but is not limited thereto. The panel controller 41 may receive a switch request of changing the destination device to which the operation input information on the touch panel 45 is sent to the post-changing device from the "post-changing device" (the image forming device 30) itself. In more detail, there is a situation in which it is desirable to notify the user of an occurrence of a failure event by use of a display screen when the failure event such as sheet jamming in the image forming device 30 occurs. In such a situation, the image forming device 30 may transmit (send) a command (switch request) of changing the destination device to which the operation input information on the touch panel 45 is sent (device using the operation display part 40) to the image forming device 30 itself to the panel controller 41 (the switch request acquisition unit 44). Further, the panel controller 41 may change the destination device to which the operation input information on the touch panel 45 is sent from the server device 20 to the image forming device 30 on the basis of the switch request received from the image forming device 30.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
a first device;
a second device; and
an operation display part that is directly connected to and controlled by both the first device and the second device,
wherein the operation display part includes:
an operation panel that is directly connected to and controlled by both the first device and the second device; and
a hardware processor that controls operations of the operation panel,
wherein the hardware processor:
sends operation input information on the operation panel to the first device via a first interface connecting the first device and the operation panel;
sends the operation input information on the operation panel to the second device via a second interface connecting the second device and the operation panel; and
receives a switch request of switching a device that uses the operation panel,
wherein the first interface and the second interface are of mutually different types, and
wherein when receiving the switch request, the hardware processor:
changes a source device from which display contents of the operation panel are sent, and
changes a destination device to which the operation input information on the operation panel is sent, and sends the operation input information on the operation panel to a post-changing destination device via a post-changing interface corresponding to the post-changing destination device out of the first interface and the second interface.

2. The image processing apparatus according to claim 1, wherein the hardware processor:
  disables the operation input information received in the operation panel in a duration between a time immediately after reception of the switch request and a time when display data on the operation panel is completely updated by a post-switching device, and sends the operation input information in the duration to neither the first device or the second device, and
  sends the operation input information received in the operation panel after the update completion to the post-changing destination device.

3. The image processing apparatus according to claim 1, wherein the hardware processor changes a destination device to which the operation input information on the operation panel is sent in response to the switch request.

4. The image processing apparatus according to claim 3, wherein the post-changing destination device discards the operation input information received in the operation panel and sent from the operation display part via the post-changing interface in a duration between a time immediately after reception of the switch request and a time when the display data on the operation panel is completely updated by a post-changing device.

5. The image processing apparatus according to claim 1, wherein the hardware processor:
  sends the operation input information on the operation panel to a pre-changing destination device until the display data on the operation panel is completely updated by a post-switching device, and
  changes a destination device to which the operation input information on the operation panel is sent in response to the update completion of the display data, and sends the operation input information received in the operation panel after the update completion time to a post-changing destination device.

6. The image processing apparatus according to claim 1, wherein the hardware processor:
  turns off the operation panel in response to the switch request, and
  turns on the operation panel again in response to update completion of the display data on the operation panel by a post-switching device, changes a destination device to which the operation input information on the operation panel is sent, and sends the operation input information received in the operation panel after the operation panel is turned on again to the post-changing destination device.

7. The image processing apparatus according to claim 6, wherein the hardware processor:
  disables the operation input information received in the operation panel in a duration in which the operation panel is turned off, and sends the operation input information in the turn-off duration to neither the first device or the second device, and
  sends the operation input information received in the operation panel after the operation panel is turned on again to the post-changing destination device.

8. The image processing apparatus according to claim 1, wherein if a series of operation inputs are being performed when the switch request is received, the hardware processor does not change a destination device to which the operation input information on the operation panel is sent until the series of operation inputs are completed, and changes a destination device to which the operation input information on the operation panel is sent after the series of operation inputs are completed.

9. The image processing apparatus according to claim 1, wherein a data transfer speed of the first interface is higher than a data transfer speed of the second interface.

10. The image processing apparatus according to claim 1, wherein:
  the number of fingers requested by the first device as the number of fingers identifiable at the same time on the operation panel is larger than the number of fingers requested by the second device as the number of fingers identifiable at the same time on the operation panel, and
  the hardware processor sends the operation input information on a smaller number of fingers when sending the operation input information on the operation panel to the second device via the second interface than when sending the operation input information on the operation panel to the first device via the first interface.

11. The image processing apparatus according to claim 10, wherein the hardware processor:
  sends the operation input information on a maximum number of fingers identifiable at the same time on the operation panel to the first device via the first interface; and
  sends the operation input information on a predetermined number of fingers smaller than the maximum number of fingers to the second device via the second interface.

12. The image processing apparatus according to claim 1, wherein the hardware processor receives a switch request of changing a destination device to which the operation input information on the operation panel is sent from one of the first device and the second device to the other device from the one device, and changes the destination device from the one device to the other device in response to the switch request.

13. The image processing apparatus according to claim 1, wherein the hardware processor receives a switch request of changing a destination device to which the operation input information on the operation panel is sent from one of the first device and the second device to the other device from the other device, and changes the destination device from the one device to the other device in response to the switch request.

14. The image processing apparatus according to claim 1, wherein the first interface and the second interface conform to mutually different standards.

15. The image processing apparatus according to claim 14, wherein the first interface is a Universal Serial Bus (USB) interface, and the second interface is an Inter Integrated Circuit (I2C) interface or Universal Synchronous Receiver Transmitter (UART) interface.

16. The image processing apparatus according to claim 1, wherein the first device is a server device, and the second device is an image forming device.

17. A non-transitory recording medium storing a computer readable program which controls a computer incorporated in an operation display part provided in an image processing apparatus comprising a first device and a second device to perform operations including:
  a) receiving a switch request of switching a destination device to which operation input information on an operation panel provided in the operation display part and directly connected to and controlled by both the first device and the second device is sent; and b) when receiving the switch request, changing a source device from which display contents of the operation panel are sent from one of the first device and the second device to the other device, displaying the display contents from the source device on the operation panel, changing a destination device to which the operation input information on the operation panel is sent from the one device to the other device, and sending the operation input information on the operation panel to a post-changing destination device via a post-changing interface corresponding to the post-changing destination device, wherein:

the first device is connected to the operation panel via a first interface, the second device is connected to the operation panel via a second interface, the first interface and the second interface are of mutually different types, and when a destination device to which the operation input information on the operation panel is sent is changed from the one device to the other device, an interface using the operation panel is changed from one interface corresponding to the one device out of the first interface and the second interface to the other interface corresponding to the other device.

18. The non-transitory recording medium a according to claim 17, wherein when receiving the switch request, the program further causes the computer to perform operations including:

disabling the operation input information received in the operation panel in a duration between a time immediately after reception of the switch request and a time when display data of the operation panel is completely updated by a post-switching device, and sending the operation input information in the duration to neither the first device or the second device; and sending the operation input information received in the operation panel after the update completion to the post-changing destination device.

19. The non-transitory recording medium according to claim 17, wherein a destination device to which the operation input information on the operation panel is sent is changed in response to the switch request.

20. The non-transitory recording medium according to claim 17, wherein when receiving the switch request, the program further controls the computer to perform operations including:

sending the operation input information on the operation panel to a pre-changing destination device until the display data on the operation panel is completely updated by a post-switching device; and changing a destination device to which the operation input information on the operation panel is sent in response to the display data update completion, and sending the operation input information received in the operation panel after the update completion to the post-changing destination device.

21. The non-transitory recording medium according to claim 17, wherein when receiving the switch request, the program further controls the computer to perform operations including:

turning off the operation panel in response to the switch request; and turning on the operation panel again in response to update completion of the display data on the operation panel by a post-switching device, changing a destination device to which the operation input information on the operation panel is sent, and sending the operation input information received in the operation panel after the operation panel is turned on again to the post-changing destination device.

22. The non-transitory recording medium according to claim 21, wherein when receiving the switch request, the program further controls the computer to perform operations including:

disabling the operation input information received in the operation panel in a duration in which the operation panel is turned off between the turning off the operation panel and the turning on again the operation panel, and sending the operation input information in the turn-off duration to neither the first device or the second device, and sending the operation input information received in the operation panel after the operation panel is turned on again the post-changing destination device.

23. The non-transitory recording medium according to claim 17, wherein:

when a series of operation inputs are being performed when the switch request is received, the program further controls the computer to maintain a destination device to which the operation input information on the operation panel is sent until the series of operation inputs are completed, and to change a destination device to which the operation input information on the operation panel is sent after the series of operation inputs are completed.

* * * * *